US007436804B2

(12) United States Patent
O'Neill

(10) Patent No.: US 7,436,804 B2
(45) Date of Patent: Oct. 14, 2008

(54) METHODS AND APPARATUS FOR USING A CARE OF ADDRESS OPTION

(75) Inventor: Alan O'Neill, Henley Beach (AU)

(73) Assignee: Qualcomm Incorporated, San Diego, CA (US)

( * ) Notice: Subject to any disclaimer, the term of this patent is extended or adjusted under 35 U.S.C. 154(b) by 809 days.

(21) Appl. No.: 10/667,309

(22) Filed: Sep. 17, 2003

(65) Prior Publication Data

US 2004/0100951 A1 May 27, 2004

Related U.S. Application Data

(60) Provisional application No. 60/411,722, filed on Sep. 18, 2002.

(51) Int. Cl.
*H04Q 7/24* (2006.01)
*H04L 12/56* (2006.01)
*H04L 12/28* (2006.01)

(52) U.S. Cl. .................. 370/331; 370/389; 370/401; 370/338

(58) Field of Classification Search .............. 370/331, 370/338, 389, 401
See application file for complete search history.

(56) References Cited

U.S. PATENT DOCUMENTS

| 6,636,498 | B1 | 10/2003 | Leung et al. | |
|---|---|---|---|---|
| 6,947,401 | B2* | 9/2005 | El-Malki et al. | 370/331 |
| 6,987,771 | B2* | 1/2006 | Shimizu et al. | 370/401 |
| 7,023,828 | B2* | 4/2006 | Korus et al. | 370/338 |
| 7,123,599 | B2* | 10/2006 | Yano et al. | 370/331 |
| 2002/0071417 | A1 | 6/2002 | Nakatsugawa et al. | |
| 2002/0186679 | A1 | 12/2002 | Nakatsugawa et al. | |
| 2003/0012179 | A1 | 1/2003 | Yano et al. | |
| 2003/0026241 | A1* | 2/2003 | Ono et al. | 370/349 |
| 2003/0123421 | A1* | 7/2003 | Feige et al. | 370/338 |

OTHER PUBLICATIONS

C. Perkins, Editor "IP Mobility Support", Network Working Group, pp. 1-79 (Oct. 1996).
Li, Yalun "Protocol Architecture for Universal Personal Computing" IEEE Journal on Selected Areas in Communications 15(8): 1467-1476 (1997).

(Continued)

*Primary Examiner*—Chau Nguyen
*Assistant Examiner*—Marcus R Smith
(74) *Attorney, Agent, or Firm*—Michael P. Straub; Kam T. Tam; Thomas R. Rouse

(57) ABSTRACT

Methods and apparatus for using a novel Care of Address option in a packet header which allows a mobile node to includes its HoA as the source address and its CoA in a new header field referred to herein as a CAO field are described. When the CAO is present, ingress filtering is performed by an access node on the address included in the CAO instead of the address in the source address, e.g., the HoA, or, is performed on the address in the CAO option field in cases where the source address does not pass ingress filtering, e.g., because the HoA corresponds to a different subnet than the access subnet due to the MN visiting a foreign subnet. Various flags may be included in the CAO field relating to security and/or processing operation to be performed by a receiving node.

55 Claims, 8 Drawing Sheets

OTHER PUBLICATIONS

J. Moy, Editor, "OSPF Version 2", Network Working Group, pp. 1-244 (Apr. 1998).

Valko, Andras "Cellular IP: A New Approach to Internet Host Mobility" Computer Communications Review 29(1): 50-65 (1999).

Andras G. Valko, "Cellular IP—A New Approach to Internet Host Mobility," ACM Computer Communication Review, vol. 29, No. 1, pp. 50-65, Jan. 1999.

TIA/EIA/IS-707A.8 "Data Service Options for Spread Spectrum Systems: Radio Link Protocol Type 2" pp. 1-1:4:12 (Mar. 1999).

Karagiannis, Mobile IP, State of the Art Report, pp. 1-63, Jul. 1999.

Elin Wedlund et al., "Mobility Support Using SIP", Proc. Of ACM/IEEE International Conference on Wireless and Mobile Multimedia (WoWMoM '99), Seattle, Washington, Aug. 1999.

Henning Schulzrinne et al., "Application-Layer Mobility Using SIP", 0-7803-7133 IEEE, pp. 29-36, Jan. 2000.

"Source Specific Multicast (SSM) Explicit Multicast (Xcast)" pp. 1-27 (Copyright 2001 by ETRI).

Marshall, W., et al., Integration of Resource Management and SIP, IETF Internet Draft, draft-ietf-sip-manyfolks-resource-02.txt, Aug. 2001, pp. 1-28.

Andrew T. Campbell et al., "IP Micro-Mobility Protocols", ACM Sigmobile Mobile Computer and Communication Review (MC2R), vol. 4, No. 4, pp. 34-54, Oct. 2001.

S. Zhou et al., "A Location Management Scheme for Support Mobility In Wireless IP Networks Using Session Initiation Protocol (SIP)", 1531-2216/01 IEEE, Oct. 2001, pp. 486-491.

Bos, L., et al., A Framework for End-to-End Perceived Quality of Service Negotiation, IETF Internet Draft, draft-bos-mmusic-sdpqos-framework-00.txt, Nov. 2001, pp. 1-22.

Papalilo, D., et al., Extending SIP for QoS Support www.coritel.it/publications/IP_download/papalilo-salsano-veltri.pdf, Dec. 8, 2001, pp. 1-6.

Camarillo, P., et al., Integration of Resource Management and SIP, IETF Internet Draft, draft-ietf-sip-manyfolks-resource-04.ps, Feb. 25, 2002 pp. 1-18.

Ho, Integration AAA with Mobile IPv4, Internet Draft, pp. 1-59, Apr. 2002.

"SIP: Session Initiation Protocol", IEFT Network Wording Group, Request for Comments: 3261, (Jun. 2002), pp. 1-29.

IETF, Network Working Group, Request for Comments: 3261 "SIP: Session Initiation Protocol", pp. 1-269 (printed as pp. 1-252) (Jun. 2002).

Network Working Group, IPv6 Prefix Delegation Using ICMPv6, pp. 1-33, Apr. 2004.

IETF Mobile IP Working Group, "Mobility Support in IPv6", D. Johnson, Rice University, C. Perkins, Nokia Research Center, J. Arkko, Ericsson; Feb. 26, 2003, downloaded from http://www.join.uni-muenster.de on Dec. 29, 2004, pp. 1-158.

Network Working Group, "IP Mobility Support for IPv4", C. Perkins, Ed., Nokia Research Center, Jan. 2002, downloaded from http://www.ietf.org on Dec. 29, 2004, pp. 1-92.

PCT International Search Report for International Application No. PCT/US03/29490, filed on Sep. 17, 2003.

IETF, Network Working Group, Request for Comments: 2205, *Resource Reservation Protocol (RSVP)—Version 1 Functional Specification*, pp. 1-105 (Sep. 1997).

IETF, Network Working Group, Request for Comments: 2206, *RSVP Management Informatin Base Using SMIv2*, pp. 1-60 (Sep. 1997).

IETF, Network Working Group, Request for Comments: 2207, *RSVP Extension for IPSEC Data Flows*, pp. 1-14 (Sep. 1997).

IETF, Network Working Group, Request for Comments: 2210, *The Use of RSVP with IETF Integrated Services*, pp. 1-31 (Sep. 1997).

IETF, Network Working Group, Request for Comments: 2208, *Resource Reservation Protocol (RSVP) Version 1 Applicability Statement Some Guidelines on Deployment*, pp. 1-6 (Sep. 1997).

IETF, Network Working Group, Request for Comments: 2209, *Resource Reservation Protocol (RSVP)—Version 1 Message Processing Rules*, pp. 1-24 (Sep. 1997).

IETF Network Working Group, Request for Comments: 2961, *RSVP Refresh Overhead Reduction Extensions*, pp. 1-32 (Apr. 2001).

* cited by examiner

US 7,436,804 B2

METHODS AND APPARATUS FOR USING A CARE OF ADDRESS OPTION

RELATED APPLICATIONS

The present application claims the benefit of U.S. Provisional Patent Application Ser. No. 60/411,722, filed Sep. 18, 2002.

FIELD OF THE INVENTION

The present invention relates to communications systems and, more particularly, to method and apparatus for using Care of Addresses in mobile communications networks.

BACKGROUND

Internet Protocol (IP) packets such as the packet 10 shown in FIG. 1 have been widely used and are well known in the art. IP packets normally include a header 11 and a packet payload 19. In the FIG. 1 example the header 11 includes a source (S) address 12 and a destination (D) address 14. Over time, IP has been enhanced to better suit a communications network where a device, e.g., a mobile node (MN) may change its point of attachment to a network. Various versions of Mobile IP now exist including Mobil IPv4 and Mobile IPv6. These versions of IP include features intended to facilitate mobility.

In the various versions of mobile IP, a mobile node is often associated with a home network where is uses a Home Address (HoA). When visiting a foreign subnet having a different address prefix from the home network, the MN may be assigned a Care of Address (CoA) which has the correct address prefix for the visited foreign subnet. The CoA can be registered with a Home Agent (HA) in the mobile node's home network which is then responsible for forwarding packets intended for the mobile node using the MNs current CoA. The Colocated type of CoA (CCoA) can be used as a source address while in a visited domain for purposes of sending packets. Since the CoA will have an address prefix matching an address prefix associated with the access node in the foreign network to which it is attached, the CoA will pass ingress filtering implemented by the access node in the visited domain. However, using the HoA as the source address, when using standard routing, e.g., in the absence of reverse tunneling or some other method of avoiding ingress filtering based on the HoA, the ingress filtering will normally fail since the address prefix of the HoA will match the prefix of the MN's HA but not the different address prefix of the access router in the visited foreign subnet. This can create several problems including the dropping of packets.

As discussed, as a MN changes its point of network attachment, mobile IP allows it to be assigned a different address, e.g., a Care of Address (CoA), which can be used to direct traffic to the MN while it is attached, e.g., to an access node in a foreign subnet. The foreign subnet Mobile IP for IPv4 addresses this problem by enabling a Mobile node (MN) to use its HoA (Home Address) as a source address on the foreign subnet when forwarding to a Correspondent Node (CN) either directly or via the Home Agent (HA) through the use of reverse tunneling. In this approach, the native forwarding follows the optimal route to the CN but incurs the risk of being discarded by ingress filtering routers due to the topologically incorrect source address. For example, an access router in a foreign network to which an MN is coupled, having a different address prefix than the HA, is likely to discard the packet from the MN having the HoA as a source address since the address prefix will fail to match the address prefix of the router to which it is compared during an ingress filtering step.

To address this problem IPv6 and MIPv6 have therefore constrained the HoA to being used as a source address when either at home or within a reverse tunnel from a foreign subnet via the HA of the MN. The CN then returns packets to the MN HoA, via the HA, and the forward (HA to MN) tunnel based on the CCoA in the HA binding for the MN. In the unicast case, the MN can then activate Route Optimization to bypass the HA in both directions by securely installing a Binding Cache Entry into the CN. The MN then sends from the CCoA source address to the CN directly via a foreign unicast or multicast system, and includes the Home Address Option (HAO) in the unicast packets so that the changing CCoA is masked from the transport layer. The CN sends directly to the MN using a routing header. FIG. 2 is an example of a MIPv6 packet which uses the HAO. In such a case, the header 25 includes a source address 22, a destination address 24, a Next Header (NH) indicator 26 and a Home Address Option field 28. The packet further includes a packet payload 29. The source address 22 is the MN's CCoA while the destination address is the address of the CN to which the packet is directed. The NH 26 is a pointer to the information in the option field 28. The HOA option field 28 includes an option type (OT) indicator which indicates the option as a home address option, an option length (OL) field indicating the length of the option field, and the HoA of the MN to which the CoA corresponds. At the access router, ingress filtering is performed using the CoA and the packet will satisfy conventional ingress filtering rules since the prefix of the CoA will be the same as that of the access router in the foreign subnet which serves as the MNs point of network attachment.

Unfortunately, the HAO presents problems in the case of multicast packets. In the multicast case, the persistent HoA cannot be used as a multicast source address because such packets will fail the multicast reverse path forwarding check that is normally performed. The MN must instead, in current systems, use its Co-located Care of Address (CCoA) on the foreign network as its source address, and a new multicast tree must be built for each new CCoA on each MN hand-off, e.g., each change in access routers used to attached to the network, to ensure that the multicast source address is topologically correct given the MN change in location. These multicast issues which can be a serious problem are discussed in detail in one or more known references relating to MIP-Multicast.

In view of the above discussion, it should be apparent that there is a need for an improved method of allowing a MN which is visiting a foreign subnet to use its HoA and a CoA (or CCoA which is a type of CoA) in a manner which will allow multi-cast reverse forwarding checks to be satisfied.

In addition to the ingress filtering problem other security issues exist with Mobile IP. Mobile IP allows for different types of headers, e.g., Hop by Hop headers and Destination Headers. IPv6 header processing rules state that the header options within an extension header (e.g., an option field) are processed by nodes according to 'defined' rules of that header. So Hop By Hop Header options, for example, are processed by all hops. In addition, header processing rules state that such processing nodes must process the options according to the three most significant bits of the option type, where for example, code 110 means that the packet should be dropped if the option is unrecognized and the option cannot be modified on route.

It is desirable to be able to implement nodes, e.g., routers that operate as firewalls at arbitrary or specifically selected points in a network. To be reliable from a security perspective, a router that wishes to police the contents of packets, for policy and firewall reasons, cannot expect a MN to create packets with suitable header types that will enable the enforcement point to check out all the options in a defined manner according to the existing extension header processing rules. For an arbitrary enforcement point to be fully capable of correctly checking extension header options, every packet from every node would need to carry all options within a Hop By Hop header, with the option type code at '111'. This would most likely result in an arbitrarily located option enforcement point discarding packets because it did not understand some options, and whose threats it cannot assess, as well as modifying options it did not like. This however is clearly not practical as it removes much of the functionality of option processing.

Accordingly, there is a need for a way to allow an arbitrary option enforcement point to examine packet options both by ignoring extension header processing rules that would normally prevent it from examining all options, as well as allowing it to ignore the option type code.

As can be appreciated from the above discussion, there is a need for improved IP addressing techniques and options which can be used to address one or more of the various filtering problems discussed above including, e.g., ingress filtering when operating from a foreign subnet, reverse path checks in the case of multi-cast packets, and the checking of options by firewalls located at arbitrary points in a network.

SUMMARY OF THE INVENTION

The present invention relates to communications sessions and packet forwarding and, more particularly to methods and apparatus for enabling a mobile node to facilitate communications with a correspondent node from a foreign subnet. The methods and apparatus of the present invention are particularly useful when a mobile node uses a topologically incorrect source address, e.g., home address (HoA), corresponding to its home subnet while visiting a subnet with a different address prefix than the one included in the HoA. Various embodiments of the present invention involve the use of a novel Care of Address option in a packet header which allows a mobile node to include its HoA as the source address and its CoA in a new header option field referred to herein as a CAO field. When the CAO is present, ingress filtering may be performed on the address included in the CAO instead of the address in the source address in the packet. The methods of the invention enable the mobile node, operating as an end node, to inform a correspondent node, to which the MN is communicating, of its current location, e.g., by providing a Care of Address (CoA), in the CAO header option field. The correspondent node can verify and/or trust the CoA based on information provided in the received packet and optionally store it for future processing related to communications with this mobile node. Various checks may be made by the access node and reflected in one or more flags included in the CAO field in various embodiments.

The use of the HoA in the source address field is in sharp contrast to prior art systems which placed the HoA in a header option field choosing instead to use the MN's topologically correct CoA as a packet source address when visiting a foreign subnet.

A novel Care of Address Option (CAO) which is an option that can be included in an IP header, e.g., a Hop by Hop or Destination Header, is described. The option can be used to redirect source address checks to an additional address included in the CAO field of the header. The additional address is normally a CoA such as a CCoA. When the novel CAO is used, the HoA is normally used as the source address.

While an ingress filtering check might fail on the source address, e.g., because the HoA has a different address prefix than the prefix associated with the ingress router, the CAO causes the CoA to be used for the ingress filtering check resulting in the packet being passed. The additional address in the CAO field, rather than the source address, e.g., HoA of the packet using the CAO, indicates to the CN and/or an intermediate node examining the packet header the present location of the MN. The CAO field contents may also be reflected back to the MN in a Destination Header to verify the contents of the triggering CAO that was received at the CN. Inverse Binding Cache Entry (BCE) is maintained in some embodiments of the invention. The BCE is an optional entry in a binding table at the CN that maintains a mapping between the MN HoA and its evolving location as well as details of how and when the CAO was received, and if, how and when the CAO was verified, e.g., by an access router or the HA. As a result, an IBCE normally includes a measure of confidence in the entry for each MN and implied or explicitly stated constraints on its use by the CN.

Option Enforcement Points (OEP), e.g., routers operating as firewalls, may be implemented in accordance with various features of the present invention. OEPs implemented in accordance with the invention may inspect options within extension headers when the header type would not otherwise have caused the OEP node to process the options. This occurs in various firewall embodiments of the invention. Thus, firewalls may examiner option field entries when not instructed to do so and may disregard other normal option processing operations and/or rules.

Various aspects of the present invention are directed to novel methods, apparatus and data structures for enabling a mobile node to roam in a foreign network, with multiple access node handoffs, while permitting the mobile node to use its home address as a source address and to collaborate with the correspondent node, the access routers and the Home Agent of the mobile node to maintain various forms of communications sessions whilst maintaining the location of the MN in an Inverse Binding Cache Entry in the correspondent node. This is achieved by sending and receiving location information within data or signaling packets, and by redirecting ingress filtering checks, where necessary, based on that information. The following description is presented in the context of explaining the novel Care of Address Option, which carries the current location of the MN, as represented by the MN, in the form of the CCoA or the HoA, within either a Hop By Hop or a Destination Header. In some cases, e.g., where privacy is of concern, the MN is allowed to provide an inaccurate address in the CAO field, i.e., an address which does not completely or accurately identify the MN's location. In such cases, an indicator is normally included in the CAO field to indicate that the CoA in the CAO field should be considered as unreliable. Another flag may be included in the CAO field to indicate when an access node serving as a MS point of attachment has verified the CoA included in the address field and indicated that it is valid.

The Hop By Hop or Destination header based CAO of the present invention can be used to both redirect ingress filtering and/or multicast RPF checks to use the address in the CAO field so that the MN can use its HoA as a source address from the foreign network directly with the CN. The Destination Header based CAO can in addition be used to inform the CN of the location of the MN when either reverse tunneling to the HA or on the home network, and hence when ingress filtering checks would already succeed. They also inform the CN of the current location of the MN. In various embodiments this information is stored by the CN in an Inverse Binding Cache Entry, which may be used by high-layer mobility aware processes, and may also be used to improve Route Optimisation procedures. In combination with a routing header, used to redirect the packet via the HA, the Destination option CAO can also be used instead of an encapsulation for reverse tunneling. This can also be accomplished by a combination of routing header and modified Home Address option which is independent of the CAO and hence a possible inclusion in the MIP base spec.

When on the home or foreign network, in accordance with the invention, a routing header can be used to route the packet via a privacy server on the same network, which can be used to verify a fictitious CAO that is used to enable the MN to give the CN a false location, e.g., address in the CAO field. This will enable the packet to pass ingress filtering in the Access Router without disclosing the real CCoA/EUI of the MN. The CN can reflect a CAO back to the MN in a Destination header either directly or via the HA using a routing header, to close the verification loop so that the MN can be reasonably confident that the CN knows the desired binding between the MN HoA and the MN CCoA. The CAO, while being well suited for unicast communications, may also be used to enable the HoA to be used as a multicast source address on a foreign subnet thereby allowing packets constructed with the HoA as a source address to pass multicast RPF checks which was not possible when the prior art Home Address option, which used the CoA as the source address, was used.

Numerous additional features, embodiments and benefits of the methods and apparatus of the present invention are discussed below in the detailed description which follows.

DETAILED DESCRIPTION

Figure 1:
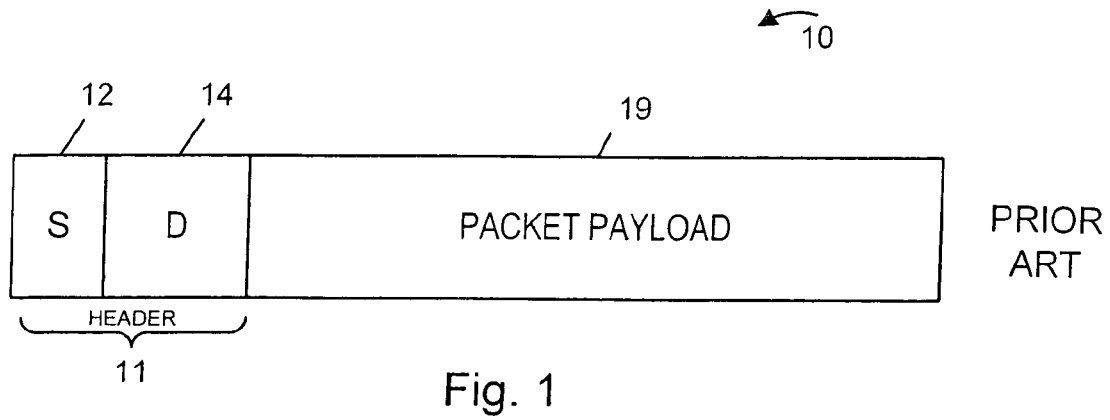
FIG. 1 illustrates a conventional IP packet.
Figure 2:
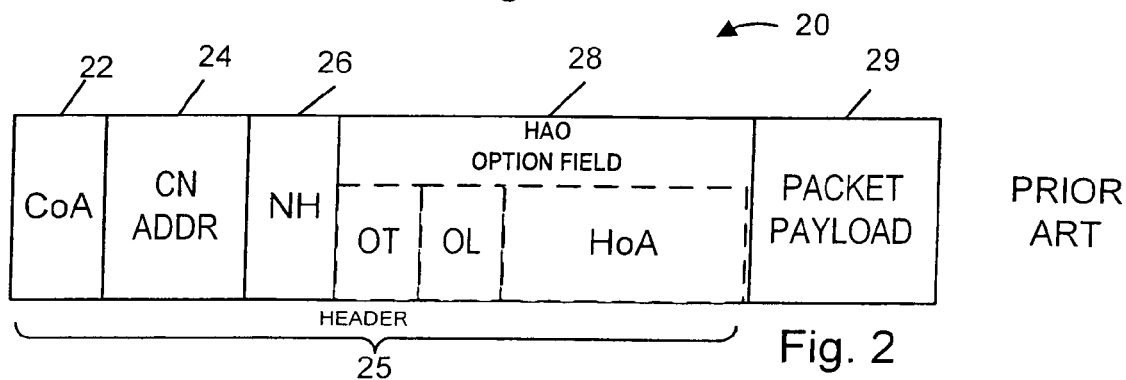
FIG. 2 illustrates an IP packet including an HOA option field as used in some known mobile communications systems.

The present invention relates to communications sessions and packet forwarding and, more particularly to methods and apparatus for enabling a mobile node to facilitate communications with a correspondent node from a foreign subnet when using a topologically incorrect source address that is from its home subnet (the home address), and to enable the mobile node to inform the correspondent node of its current location (an address) which the correspondent node can verify and store for future processing related to communications with this mobile node.

Various aspects of the present invention are directed to novel methods, apparatus and data structures for enabling a mobile node to roam in a foreign network, with multiple access node handoffs, while permitting the mobile node to use its home address as a source address and to collaborate with the correspondent node, the access routers and the Home Agent of the mobile node to maintain various forms of communications sessions whilst maintaining the location of the MN in an Inverse Binding Cache Entry in the correspondent node. This is achieved by sending and receiving location information within data or signaling packets, and by redirecting ingress filtering checks, where necessary, based on that information. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown and the inventor regards his invention as the following disclosed methods, apparatus and data structures and any other patentable subject matter and embodiments made obvious by the text of this application.

Much of the terminology used in this document is well known and finds widespread usage in Mobile IPv4 [MIPv4] and [MIPv6] specifications and drafts. In an attempt to use terminology in a consistent manner the following nomenclature will used to describe the content of various figures, e.g., FIGS. 3, 6, 7 and 8, which show various novel embodiments and features of the present invention.

MN—Mobile Node
    CN—Correspondent Node
    HA—Home Agent
    HoA—Home Address from HA
    CCoA—Co-located Care of Address from foreign network
    HAR—Home Access Router (default router on the home network)
    FAR—Foreign Access Router (default router on the foreign network)
    OEP—A general Option Enforcement Point that passes CAO packets.
    R—A general core router on the path of the packet.
    ^—the destination node according to the current destination address
    >—a node traversed by that packet
    [—an encapsulating node
    ]—a decapsulating node
    I—a node that undertakes a legacy ingress filtering check on source address.
    E—an option enforcement point that supports enhanced CAO-based ingress filtering.

H—a Defined node that supports enhanced CAO-based ingress filtering

X—a node that discards a packet due to an incorrect source address

S—an option enforcement point that snoops and passes the CAO unaffected.

Various terms used in the present application will now be explained further so that they can be properly interpreted in the description which follows.

Mobile Node: A host or router that can change its point of attachment from one network or sub-network to another.

Mobile nodes may have some or all of the following attributes. A mobile node may change its location without changing its IP address; it may continue to communicate with other Internet nodes at any location using its (constant or persistent) IP address (known as the home address or HoA), assuming link-layer connectivity to a point of attachment is available. In various embodiments a mobile node is given a long-term (or persistent) (e.g., IP) address on a home network. This home address may be administered in the same way as a "permanent" IP address is provided to a stationary host. When away from its home network, a "care-of address" is associated with the mobile node that is related to the mobile node's current point of attachment, called its location. The mobile node normally uses its home address as the source address of all IP datagrams that it sends, but must first reverse tunnel such packets from a foreign network to the Home Agent of the mobile, where the home address is topologically correct, so that ingress filtering will pass the packet.

Access Node: A node that serves as a network attachment point for one or more mobile nodes. The access node may have wireless interfaces and support hand-off to enable a mobile node to rapidly and efficiently change Access Nodes.

Cell: The area of wireless coverage resulting from radio propagation and system limits that extends out from a radio antenna on an access node.

Session: A communication relationship that typically involves a bi-directional flow of packets between a mobile node and at least one correspondent node.

Session Peer: A peer with which a network node, e.g., a mobile node, has a negotiated session. Session peers can be mobile or stationary and is also called the correspondent node interchangeably.

Link: A facility or medium over which nodes can communicate at the link layer. A link underlies the network layer.

Link-Layer Address: An address used to identify an endpoint of some communication over a physical link. Typically, the Link-Layer address is an interface's Media Access Control (MAC) address.

Node: A network element that serves as a forwarding device. A router is an example of one type of node.

Ingress filtering: A process where a node compares the incoming interface of a packet to the expected interface according to unicast routing, and other mobility related address state, for the source address of that packet. This is used for example to prevent source address spoofing whereby an internet host can pretend to be another such host by using its IP address as a source address.

Figure 3:
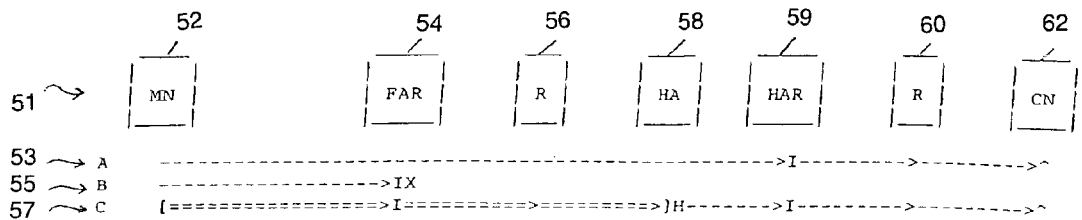
FIG. 3 is an example of an exemplary communication system including some elements which support the Care of Address Option (CAO) and signaling that may occur in such a system.

FIG. 3 shows a communications system 51 and related signaling. The system 51 includes a MN 52, a FAR 54, an R 56, an HA 58, a HAR 59, a second R 60 and a CN 62 which are coupled together in a manner that allows signals, e.g., packets to be communicated between the various system elements. Three possible forwarding paths between the MN 52 and the CN 62, with the related signaling are shown in rows 53, 55 and 57, respectively. These three forwarding paths can be used when the MN 52 is on its home or a foreign network, and the MN 52 uses its HoA as a source address. The FAR 54, HAR 59 and HA 58 are at least option enforcement points but may also be defined option processors. The FAR 54 and HAR 59 are CAO aware ingress filtering nodes.

In flow A 53, the HAR examines the packet source address and because it is valid will be forwarded to the CN.

In flow B, the FAR examines the packet source address and because it is invalid on the foreign network (not from a prefix on the FAR 54) then the packet will be dropped.

In flow C, the MN 52 is reverse tunneling so the MN 52 will encapsulate in the CCoA which will pass source address ingress filtering examination in the FAR 54. The HA 58 decapsulates, checks the CCoA source address against the registered binding, and forwards the successful packet toward the CN 62. The HAR 59 examines the packet source address which again passes because it is the MN HoA.

From the signaling illustrated in FIG. 3, it should be appreciated that elements implemented in accordance with the present invention remain backwards compatible. More importantly, however, they can also be used to implement the method of the present invention.

Figure 4:
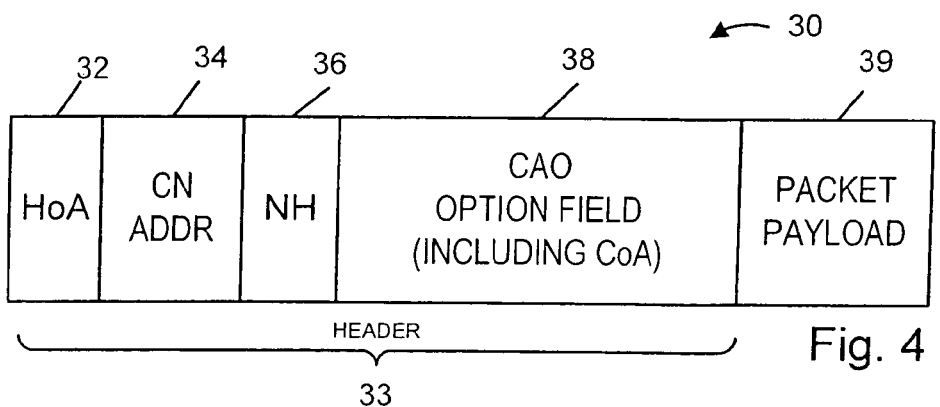
FIG. 4 illustrates an exemplary IP packet including a CAO header option field implemented in accordance with the present invention.

To better understand the invention, the structure of an exemplary IP packet 30 generated in accordance with the invention will now be described with reference to FIG. 4. As illustrated the packet 30 includes a header 33 and a packet payload 39. The header 33 includes a source address 32, e.g., a HoA corresponding to a MN sending the packet, a destination address 34 corresponding to a correspondent node, a next header indicator 36, and a novel CAO option field 38 implemented in accordance with the present invention. TheCAO field 38 includes an additional address, normally a CoA of the MN sending the packet 30, which has an address prefix, prefix 2, 35 that, in most embodiments, is different from an M bit address prefix, prefix 1, 37 included in the source address 32. The L bit address prefix, prefix 2, 35 of the CoA included in the CAO option field will normally be the same as an L bit address prefix associated with an interface on an access router in a foreign subnet through which the MN sending the packet 30 connects to the communications network. This L bit address prefix, prefix 2, 35 will differ from an M bit address prefix, prefix 1, 37, e.g., the first M bits of the source address 32 when the source address is an HoA and the address in the CAO is the true CoA of the mobile node sending the packet. L and M may include the same number of bits. The M bit address prefix, prefix 1 37, of the HoA 32, will match an address prefix associated with an interface of the MN's Home Agent in its home domain. The packet 30 is normally generated and stored in the memory of an MN before being communicated to an access router. The access router to which the MN is attached and through which the packet is routed often includes mobile IP attendant functionality, e.g., a mobile IP attendant routine or module. Thus, the second address prefix 35 corresponds, in some cases, to node which operates as a mobile IP attendant. Thus, the present invention is directed to, among other things, an MN including a machine readable medium including a packet having the novel fields and content of the packet 30.

Figure 5:
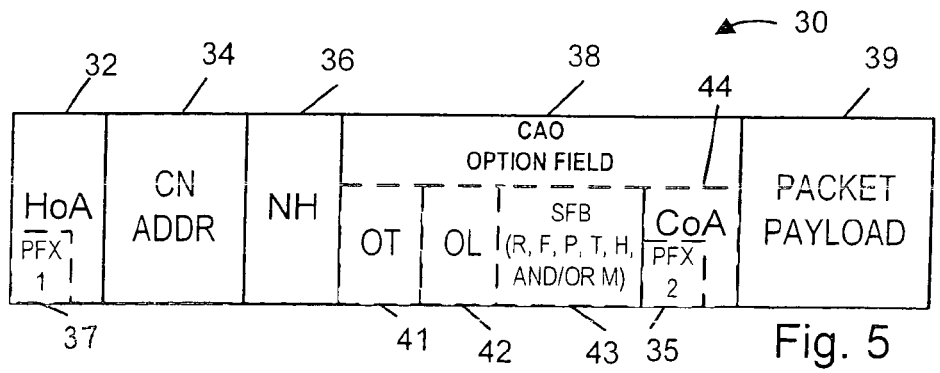
FIGS. 5 illustrates the exemplary IP packet including a CAO header option field of the present invention in greater detail

FIG. 5 shows the exemplary packet 30 in greater detail. As can be seen in FIG. 5, the CAO field 38 includes a option type indicator 41, an option length indicator 42, a signaling flags bit field 43 with various defined signaling bits which are used to convey various types of information about the address included in the CoA field 44, various verification operations which may or may not have been performed in regard to the content of the CoA 44 included in the option field, the accuracy of the CoA 44, etc. In some embodiments, signaling flags bit field 43 also includes some reserved, undefined bits. Various possible signaling bits will be discussed in detail below. The type indicator 41 can be used to indicate which nodes along a communication path should process the contents of the option field. This can be done by assigning different option types to options which are to be processed by different nodes, e.g., end node and intermediate nodes along the communications path over which the packet 30 travels. As will be discussed below, in some embodiments of the present invention, e.g., firewall embodiments, the node receiving the packet 30 will disregard the option type indicator and or one/or more reserve bits and process the contents of the option field contrary to the option type indicator and/or reserve bit value, e.g., to provide an address filtering operation using the address 44 as part of a security check operation. Modified Processing Rules for the Foreign Network will be described in accordance with the methods of present invention.

Figure 6:
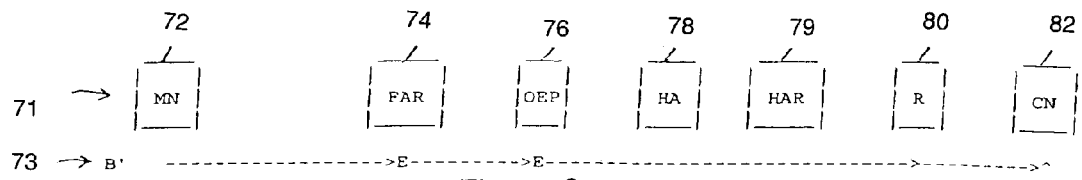
FIGS. 6-8 illustrate exemplary communications systems implemented in accordance with the present invention and various exemplary signaling that may occur in such systems

FIG. 6 shows an exemplary system 71, implemented in accordance with the present invention, and related signaling. The system 71 includes a MN 72, a FAR 74, an OEP 76, a HA 78, a HAR 79, a R 80 and a CN 82 which are coupled together in a manner that allows signals, e.g., packets, to be communicated between the various system elements. The elements 72, 74, 76, 78, 79, 80, 82 can be implemented using devices implemented in accordance with the present invention. The MN 72 operates as an end node. The MN 72 may serve as one end of a communications session. One possible forwarding path between the MN 72 and the CN 82, is flow B' 73. In flow B' 73 packet(s) from MN 72 to CN 82 traverses FAR 74, OEP 76, and R 80; FAR 74 and OEP 76 are option enforcement points that support enhanced CAO-based ingress filtering. With respect to flow B' 73, the MN 72 is again on the foreign network but this time uses the Destination Header to carry the CAO including the MN CCoA. This means that a router on the path that chooses to enforce options (such as the OEP 76) can undertake CAO based ingress filtering. Any such router, that does not understand the CAO, will drop the packet by default, but may pass the packet if the CAO is topologically correct. Therefore, if each of the Option Enforcement Points 74,76 between the MN 72 and the CN 82 are CAO aware then this will ensure that the MN 72 can send directly to the CN 82 and may avoid reverse tunneling to the HA 78. The FAR 74 SHOULD advertise its support for the CAO enhanced ingress filtering in the Router Advertisement and the MN 72 should use the HoA source address directly with the CN 82 if this advertisement is received.

Figure 7:
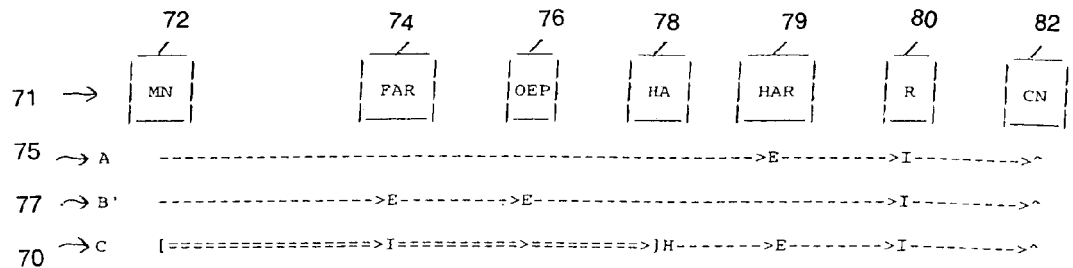

MN Location Exchange shall be discussed in the context of the present invention. FIG. 7 shows exemplary system 71 and related signaling. FIG. 7 illustrates different forms of communication that a MN 72 can now undertake as a result of this invention, and illustrates how the MN 72 can in addition provide the CN 82 with its location. The MN 72 sets a flag, the filter flag (F), in the CAO to indicate whether the CAO or the source address is to be used for ingress filtering. If the filter flag is set (F=1) then the ingress filtering is on the contents of the CAO whilst if it is not set (F=0) then the ingress filtering is on the source address. The diagram also includes the cases when the MN 72 tries to lie about its location to illustrate the level of confidence that the CN 82 can place in the contents of the CAO.

The following description applies with respect to flow A 75 of FIG. 7.
No CAO (packet delivered but location hidden)
CAO=HoA, F=0 (to support legacy ingress filtering nodes, e.g. R 80)
CAO=HoA, F=1 (will pass CAO aware OEPs, e.g. HAR 79)
CAO=fake, F=0 (not allowed by HAR 79)
CAO=fake, F=1 (will be dropped during CAO checks in any node)

In flow A 75, the MN 72 is in its home network and sends a packet to CN 82, said packet traverses HAR 79 and R 80. HAR 79 is an option enforcement point that supports enhanced CAO-based ingress filtering, and R 80 is a node that undertakes a legacy ingress filtering check on source address. In flow A 75, the MN 72 is at home and can optionally put a CAO into a Destination Header including the HoA of the MN 72. The filter flag is desirably set to F=0 but MAY be set to F=1. The HAR 79 SHOULD be able to check and recognize either a source address or a CAO that includes an address that is not from the home network.

The following description applies with respect to flow B' 77 of FIG. 7.
No CAO (packet dropped at FAR 74 due to incorrect source address)
CAO=CCoA, F=1 (to preserve the topologically incorrect source address)
CAO=fake, F=1 (a false location causes the packet to be dropped)
CAO=fake, F=0 (not allowed by FAR 74)

In flow B' 77 the MN 72 is in a foreign network, and sends a packet to CN 82, which traverses FAR 74, OEP 76, and R 80. FAR 74 and OEP 76 are optional enforcement points that support enhanced CAO-based ingress filtering. In flow B' 77, similar processing rules apply except that the omission of the CAO is no longer possible and hence the CN 82 learns the CCoA and the EUI-64 of the MN 72. The FAR 74 should be able to check and recognize a CAO that includes an address that is not from the foreign network.

The following description applies with respect to flow C 70 of FIG. 7.
No CAO (packet delivered but location hidden)
CAO=CCoA, F=0 (to avoid discard due to the topologically incorrect CAO)
CAO=CCoA, F=1 (will be discarded during CAO checks in any node)
CAO=HoA, F=0/1 (not allowed by HA 78)
CAO=fake, F=0 (not allowed by HA 78)
CAO=fake, F=1 (not allowed by HA 78 & dropped during CAO checks in any node)

In flow C 70, the MN 72 is sending a packet to CN 82. In flow C 70, the MN 72 is an encapsulating node; FAR 74 is a node that undertakes legacy ingress filtering on source address; HA 78 is a decapsulating node and a Defined node that supports enhanced CAO-based ingress filtering; HAR 79 is an option enforcement point that supports enhanced CAO-based ingress filtering; R 80 is a node that undertakes a legacy ingress filtering check on source address. In flow C 70, the MN 72 is reverse tunnelling and the HA is used to assist the HAR 79 in being able to distinguish between a packet from a foreign MN 72 that can have a CAO=(CCoA=foreign, F=0) and a home MN 72 that cannot (i.e., MN 72 is lying about its location). The HAR 79 can distinguish between packets from a MN 72 and those from the HA 78 due to the link-layer addresses and the RA from the HA 78. However, if this link-layer information is not considered sufficient for each of the cases, then the MN 72 SHOULD use a type 0 routing header including the CN 82 address and set the inner packet destination address to that of the HA 78. The HA 78 is then a Defined processor of the CAO and after swapping the CN 82 address into the destination address, the HA 78 address will remain in the RH which will be received by the HAR 79. The HAR 79 should be configured with, or learn securely the HA 78 addresses on the home network, so that packets checked by the HA 78 can be distinguished at L3, from those that have been sent directly by MNs 72 or indirectly via MNs 72 pretending to be HAs 78. The HAR 79 then discards packets where the CAO=(CCoA=foreign, F=0) except if received via a trusted HA 78.

CAO Specific Processing Rules at the CN shall be described below. The inclusion of a Care of Address option within either a Hop by Hop or a Destination Header does not affect the destination node's processing of this single packet but can create or modify state in the correspondent node 82 in the form of an Inverse Binding Cache Entry (IBCE). The CN 82 MAY inspect the evolving contents of the CAO and as a result MAY build an Inverse Binding Cache Entry (IBCE). This IBCE can be used by the CN 82 to track the location of the MN 72 in the topology if the MN 72 so desires and for the networking stack and high-layer processes to be aware of hand-off activity and MN 72 location. Specifically, the CAO can include flags, that signal mobility events to the CN such as the M flag (movement) when a hand-off is starting on the old CCoA. However, the presence of a Care of Address option in a received packet SHOULD NOT alter the contents of the receiver's Route Optimization Binding Cache and SHOULD NOT cause changes in the routing of subsequent packets sent by this receiving node without additional activity.

The contents of the CAO in a Hop By Hop option header has been verified by the routing infrastructure as being topologically correct. The contents of the CAO in a Destination header has been partially verified by the routing infrastructure and verified by the home or foreign network. In either case, this does not prevent a 'man in the middle' attacker within the infrastructure or on the access link of the CN 82 from modifying the contents of the CAO and replacing it with a topologically correct CAO at that location, which henceforth will still pass CAO based ingress filtering on route to the CN 82. Additional security processes are therefore desirable for the CN 82 to achieve a higher level of trust of the MN 72 location for Route Optimization purposes. In other case, the IBCE is used for MN 72 location tracking and provides little incentives for an attacker to go to great expense just to affect the contents of the IBCE.

Figure 8:
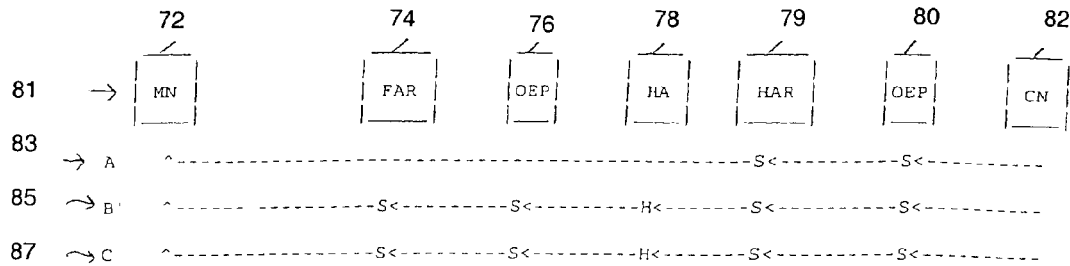

In the absence of a security association (SA) to authenticate or encrypt the CAO within a Destination Header, the CN 82 can acquire additional confidence in the contents of the CAO through the reflection process (FIG. 8).

FIG. 8 shows an exemplary system 81, implemented in accordance with the present invention, and related signaling. The system 81 includes a MN 72, a FAR 74, an OEP 76, a HA 78, a HAR 79, a second OEP 89 and a CN 82 which are coupled together in a manner that allows signals, e.g., packets to be communicated between the various system elements. The elements 72, 74, 76, 78, 79, 89, and 82 can be implemented using devices implemented in accordance with the present invention. Three possible forwarding paths: path A 83, path B' 85, and path C 87, between CN 82 and MN 72 are shown in FIG. 8 to illustrate how additional confidence in the CAO may be acquired through the reflection process. In path A 83, CN 82 sends packets to destination node MN 72, located in its home network, said packets traverse node OEP 89 and node HAR 79; both nodes OEP 89 and HAR 79 are option enforcement points that snoop and pass the CAO unaffected. In path B' 85, CN 82 sends packets to destination node MN 72, located in a foreign region, said packets traverse nodes OEP 89, HAR 79, HA 78, OEP 76, FAR 76; OEP 89, HAR 79, OEP 76, and FAR 74 are option enforcement points that snoop and pass the CAO unaffected, while HA 78 is a defined node that supports enhanced CAO-based ingress filtering. In path C' 85, CN 82 sends packets to destination node MN 72, located in a foreign region, said packets traverse nodes OEP 89, HAR 79, HA 78, OEP 76, FAR 76; OEP 89, HAR 79, OEP 76, and FAR 74 are option enforcement points that snoop and pass the CAO unaffected, while HA 78 is a defined node that supports enhanced CAO-based ingress filtering.

The CN 82 MAY reflect back the contents of a received CAO to a MN 72, using a Destination Header, within session response packets, or when those are not available, MIP signaling packets. This reflection SHOULD be undertaken immediately on receipt of a triggering CAO to avoid the contents of the CAO becoming stale, which could result in a failed verification and a discarded response packet. The receipt of a reflected CAO informs the MN 72 that the CN 82 is maintaining an IBCE for the MN 72, as well as the current location of the MN 72 included in that IBCE at that CN 82. The MN 72 can therefore detect whether the CN 82 has an incorrect location created through an attack or as a result of a CN 82 bug. The MN 72 SHOULD discard packets including an incorrect entry and return an ICMP message back to the CN 82, reporting the failure of the CAO. The ICMP message SHOULD include the erroneous CAO and the reason for the failure. The MN 72 MAY alternatively process the packet and send a new CAO to the CN 82 immediately. The CN 82 may also use a reflected CAO entry of 'all 0' to autonomously request a CAO update from the MN 72. The reflection process ensures that an attacker be on both paths to be able to modify both the inbound and the outbound CAO. The Reflected CAO is also amenable to end to end security, whilst the use of the triggering CAO for ingress filtering and RPF redirection generally prevents this. However, the CN 82 may prefer to have both the MN 72 and its HA 78 verify the reflected CAO which then involves the CN 82 using a routing header and placing the Destination Header above that routing header. The combination of a triggering CAO in an extension header followed by a reflected CAO in a Destination Header, enacted periodically during a session, gives the CN 82 a high level of confidence that its IBCE does indeed include the current and evolving location of the MN 72. In both these cases, and potentially in other cases, the IBCE may assist with subsequent installation of Route Optimization between the MN 72 and the CN 82. A session in which the MN 72 and CN 82 are periodically and mutually verifying the MN 72 location (HoA/CoA binding) may provide significant levels of confidence in advance of the Route Optimisation procedure and in so doing potentially reduce the additional message exchanges presently envisaged in the base MIPv6 spec. Essentially, the CAO is a proactive binding tracking mechanism whilst the COT(I)/HOT(I) sequence is a reactive mechanism enacted at the point of hand-off. The IBCE contents might also be useful for identifying candidate sessions for the installation of route optimization because a MN 72 with a stable or slow moving location is preferable to one with high-mobility dynamics due to the significant security and signaling load (bandwidth/latency costs) with RO each time the MN 72 undertakes a hand-off. Finally, the movement information of the MN 72 in the IBCE can be used for policy and application control of sessions that are affected by either location, roaming or mobility events.

Format and Usage Rules for the Care of Address Option, of the present invention shall now be described.

Figure 9:
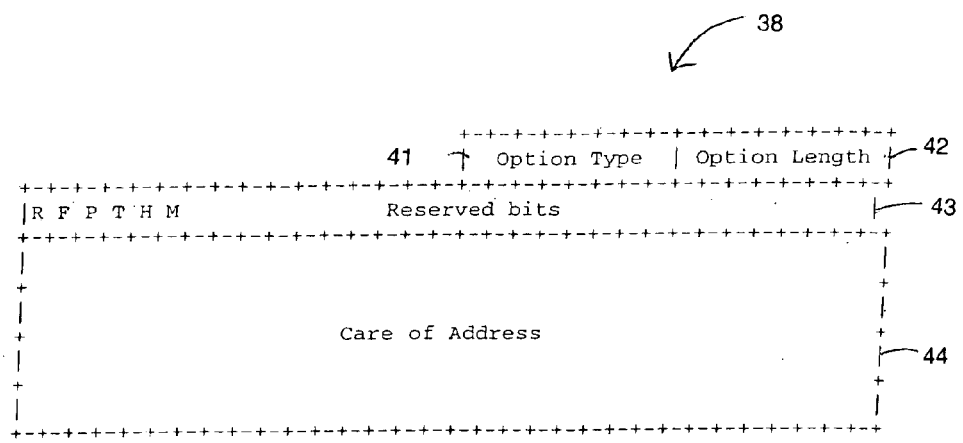
FIG. 9 illustrates the contents of an exemplary CAO field implemented in accordance with the present invention.

The Care of Address Option, of the present invention, is encoded in type-length-value (TLV) format as illustrated in drawing 38 of FIG. 9 and described below. The Care of Address option illustrated in drawing 38 includes an Option type field 41, an option length field 42, a signaling flags bit Field 43, with defined signaling bits and, in some embodiments, with some reserved, undefined bits, and a Care of Address option (CAO) address field 44. The CAO address field 44 normally includes a Care of Address (CoA), which is the CoA of the MN. Option Type field 41 includes a value indicating the COA option. The Option Length field 42 SHOULD be set to 16. The signaling flags bit field 43 includes an R bit, an F bit, an P bit, an T bit, an H bit, and an M bit. If the R bit is unset, (R=0), this indicates that this is the CAO of the sender. When the R bit is set, (R=1), this indicates that this is the CAO of the receiver and the CAO has been reflected. When the F bit is set, (F=1), the indication is that the ingress filtering SHOULD be undertaken on the address in the CAO address field 44. When the F bit is unset, (F=0), it means that the ingress filtering SHOULD be conducted on the packet source address. When the P bit is set, P=1, this indicates that the Care of Address field 44 includes the prefix of the MN only. When the T bit is set, T=1, this indicates that the MN has not included a fake location in the CAO address field 44 when the H bit is also set. No specific information is indicated by the T bit being unset (T=0). When the H bit is set (H =1),this indicates that the CAO will be verified by the MN's HA and may be used by a CN to indicate that the location may be fake. When the M bit is set (M=1), this indicates that the MN is starting a hand-off from the location address included in the CAO address field 44.

The Care of Address option address field 44 may include the present Care of Address (location) of the mobile node, which can be either the MN CCoA or the HoA. The information in the CAO address field 44 can be either the full address of the location, the prefix of the access router or a fake address.

A CAO with the R bit unset can appear in either the Hop By Hop or Destination Headers in a packet, but not both at the same time. Within the same packet, a reflected CAO with the R bit set MAY also be included in a Destination Header. A CAO with the R bit set SHOULD NOT appear in a Hop By Hop Header. Therefore, the Care of Address Option with the same R bit setting, SHOULD NOT appear twice in the same packet header. A CAO with the R bit unset can appear at most N times within a N-fold encapsulated packet. A CAO with the R bit set can also appear at most N times within a N-fold encapsulated packet.

IPv6 requires that options appearing in a Hop-by-Hop Options header or Destination Options header be aligned in a packet so that multi-octet values within the Option Data field of each option fall on natural boundaries (i.e., fields of width n octets are placed at an integer multiple of n octets from the start of the header, for n=1, 2, 4, or 8) [11]. The alignment requirement [11] for the Care of Address option is 8n+6.

The Care of Address Option MAY be included in a Hop by Hop Header when;
  the MN is at home, or at a foreign network and either sends directly to
  the CN or reverse tunnels to the CN via its HA, and
  the MN uses its HoA as the source address.

The Care of Address Option MAY be included in a Destination Header when;
  the MN is at home, or at a foreign network and either sends directly to
  the CN or reverse tunnels to the CN via its HA, and
  the MN uses its HoA as the source address.

The Care of Address Option MAY be reflected in a Destination Header when;
  the CN has received a CAO from the MN,
  the CN has created an IBCE for the MN, and
  the CN is sending to that MN HoA either directly, or
  the CN is sending to that MN HoA via its HA.

Multicast addresses, link-local addresses, loopback addresses, IPv4 mapped addresses, and the unspecified address, SHOULD NOT be used within a Care of Address option.

The Care of Address option in the Hop By Hop Header SHOULD be placed as follows:
  Before the Destination Header, if that header is present
  Before the Routing Header, if that header is present
  Before the Fragment Header, if that header is present
  Before the AH Header or ESP Header, if either one of those headers is present.

The Care of Address option in the Destination Header SHOULD be placed as follows:
  After any Hop By Hop Header
  Before the Routing Header, if that header is present
  Before the Fragment Header, if that header is present
  Before the ESP/AUTH Header, if this header is present.

This enables the Routing Header to formally control which nodes, such as the HA and MN, process the CAO in the Destination Header but means that the CAO cannot be encrypted. The HA and any other OEP MAY also snoop the CAO in unencrypted packets that pass through it as part of existing MIP operations.

The Care of Address option in the Destination Header MAY be placed as follows:
  After any Hop By Hop Header
  After the Routing Header, if that header is present
  After the Fragment Header, if that header is present
  After the ESP Header, if this header is present.

This enables the CAO contents to be encrypted and ensures only the CN can process the CAO. The appropriate rules for the AH header have not been included merely for simplicity reasons but it is clear that ESP and the Auth header can be used to authenticate the contents of the CAO and build trust in the IBCE at the CN.

Security considerations will now be discussed. The Care of Address Option provides an optional facility for the MN to send directly to the CN yet still potentially pass ingress filtering, and/or to inform the CNs of its topological movement.

The source address of such packets is the HoA of the MN, and the HoA also serves as the return address. The MN can include the CAO in such packets but this option does not in any way affect the routing of subsequent packets. The packet source address and the returned packets destination address are the same, being equal to the MN HoA. Packets including the CAO do not therefore offer the redirection threats that were originally offered by MNs originating packets from the CCoA, and including the Home Address Option (HAO). This redirection threat resulted is such packets being banned in the base spec unless the MN/CN have securely installed a BCE in the CN, and this ban forces a MN to have to reverse tunnel packets to the HA in the absence of RO.

If the MN wishes to hide its location it can simply not include a CAO. Packets are not being rerouted based on the CAO and even if they were, it would only affect its own communication so the MN has little incentive to lie about its location and its mobility events.

The CAO processing rules ensure that the MN cannot abuse the CAO system and significantly mislead the CN. The access routers on both home and foreign networks should specifically prevent a MN from including an address into the CAO that is not its own and that has not been policed by the HA, but is valid at the access router and hence would have passed CAO based ingress filtering checks. An attacker on the same network as the MN can potentially try to send packets using the HoA and CCoA of another MN but clearly cannot otherwise intercept, or interfere with, the communications between the MN and the CN. This is true whether or not the CAO is added and is simply an additional requirement on the access router to be able to deny such opportunities to attackers.

Ongoing communications between a MN and a CN based on the HoA, provides the CN with confidence that the MN is reachable at the HoA at some arbitrary subnet via the HA. The inclusion of the CAO in a subset of packets from that MN provides the CN with a reasonable level of confidence that the MN is at that CCoA. A man in the middle attacker can modify the CAO and the CRC of a packet, but in doing so can neither hijack communications nor reroute packets. This is because return packets are still routed via the HA and will be correctly delivered to the MN at its presently registered CoA. The attacker could install an invalid CAO into a packet that might well fail upstream ingress filtering checks. This would cause the packet to be discarded but such an attacker could have removed the packet itself, so the addition of the CAO simply opens more subtle ways of discarding packets at significant expense to the attacker. The attacker can add a topologically correct address into the CAO from its location on the path to the CN, and then change it back on the return path but this offers nothing directly to the attacker at significant cost to itself. Additional security processes are desirable to enable the IBCE to be used for Route Optimization.

Figure 10:
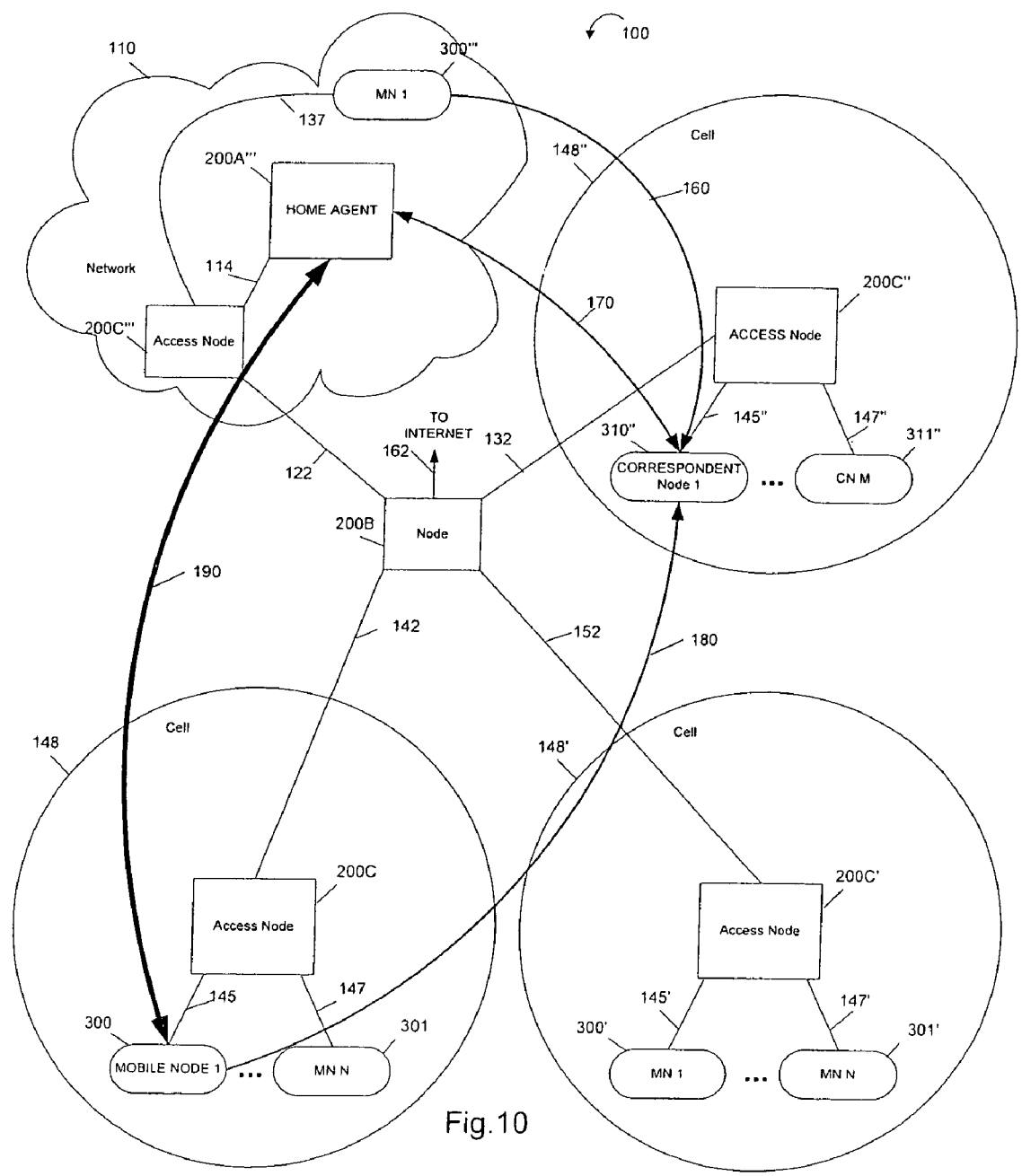
FIG. 10 illustrates an exemplary communication system in which the present invention may be used.

FIG. 10 illustrates an exemplary communications system 100 implemented in accordance with the methods and apparatus of the present invention. The system 100 includes first, second and third cells 148, 148' and 148", and a network 110. Cells 148, 148', 148" and network 110 are coupled to a router node 200B using links 142, 152, 132 and 122, respectively, where the B indicates that node 200B is a general router node. General router node 200B may also be coupled to, e.g., the Internet via link 162. As shown, the cell 148 includes a node 200C, where the C indicates the node 200C is an access (router) node, and a plurality of mobile nodes MN 1 300, MN N 301. The access node 200C manages mobile nodes (MNs) 300, 301 whilst in said cell 148, specifically providing bi-directional wireless communications links 145,147 between the access node and each mobile node MN1 300, MN N 301, respectively, as well as a bidirectional link 142 between access node 200C and the general router 200B. The access node 200C also provides an address to the mobile nodes 300, 301 when in the cell 148 called the Co-located Care of Address or CCoA. This CCoA can be used as a source address by mobile nodes 300, 301 when in the foreign network of cell 148, and the access node 200C will allow this address to pass its ingress filtering check whereby the access node 200C ensures the source address is one of its addresses, and that that CCoA belongs to that specific MN. Cellular networks are typically comprised of a multitude of such cells 148. In regard to FIG. 10, the second cell 148' and the third cell 148" are other cells which are the same as or similar to cell 148. Elements of the second cell 148' and third cell 148" are denoted using a' and a" respectively to distinguish them from like numbered elements of the first cell 148. For example, access node 200C' is in the second cell 148'. Note that correspondent node (CN) 310" in cell 148" is a stationary node for the purposes of this description although it is connected to access node 200C" over a wireless link 145" and therefore has a stable IP address.

The MN 1 300 in cell 148 is originally from the home network 110, and when MN 1 is located in its home network 110 which includes Home Agent 200A''', MN 1 is labeled MN 1 300'''. The Home Agent (HA) 200A''' and MN 300''' are on a broadcast LAN within network 110 including links 137 and 114, which couples HA 200A''' and MN 300''' to the access node (AN) 200C'''. AN 200C''' is coupled to the general router node 200B via link 122. The MN 300''' has a home address allocated from the HA 200A''' called the home address (HoA) which is a valid address at access node 200C''' for ingress filtering purposes. This address is used as a source address by MN 300''' when on its home network 110. The correspondent node (CN) 310" in cell 148" is the session peer of the MN 300''' and hence the MN300''' sends packets to the CN 310" using the HoA of the MN 300''' as a source address and the CN 310" address as the destination address as shown by the packet flow 160. Return packets from the CN 310" to the MN 300''' use the CN 310" address as the source address and the HoA of MN 300''' as the destination address which will be routed towards the Home Agent 200A''' and the MN300''' as shown in packet flow 170. When the MN 300''' is at home, the MN 300''' receives the packet directly from the access node 200C''' rather than having it forwarded by the HA 200A'''. When the MN 300''' moves away from its home network 110 to the foreign network 148, becoming MN 300, then the MN 300 gets a CCoA from the access node 200C, which it registers into its HA 200A''' as its location in a binding table. Packets from the CN 310" to the MN 300 then again use flow 170 but now at the Home Agent 200A''' they are encapsulated into a packet with the destination address equal to the currently registered CCoA of the MN300 and forwarded to the MN300 on the foreign network in cell 148 as shown in flow 190. Note that flows 170 and 190 are bidirectional in that the MN 300 also send return packets to the CN 310" using the HoA as the source address, via a reverse tunnel to the HA 200A''' with the reverse tunnel including the source address of the MN300 on the foreign link, this being the CCoA. The HoA source address is hidden by the CCoA so that the packet will pass the ingress filtering check in the access node 200C. This is because if the access node 200C, or a subsequent node such as router node 200B, sees the topologically incorrect HoA source address then the ingress filtering in said nodes 200C, 200B will discard the packet. While in known systems this would normally result in a communication session being dropped, in accordance with the present invention a communications session based on the HoA from the foreign network, e.g., foreign network of cell 148, will succeed as will be discussed further below.

In accordance with the invention, the MN300 would be able to send the packet directly to the CN 310" as shown in flow 180, without having to route the packet indirectly via the HA 200A'''. It is this flow 180 that utilizes the addition of the Care of Address Option (CAO), of the present invention, to redirect the ingress filtering check to the current CCoA of the MN 300 which is included in the CAO, and which is therefore topologically correct at that location, according to unicast routing tables.

Figure 11:
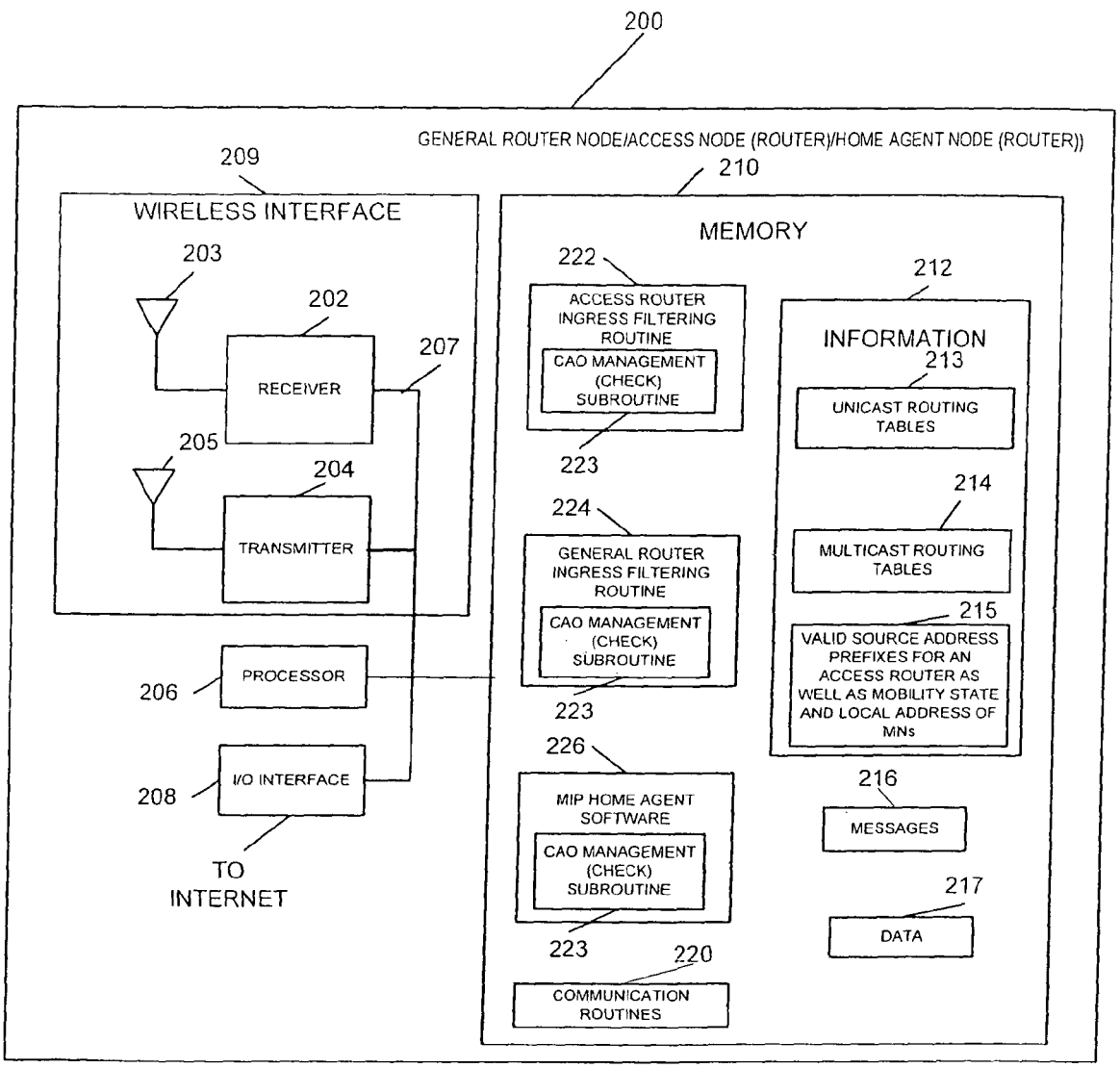
FIG. 11 is a block diagram of an exemplary router node that may be used in the communications system of FIG. 10.

FIG. 11 is a block diagram of an exemplary general router node/access node/home agent node 200 that may be used in the communications system of FIG. 10 as e.g. node 200B, 200C, 200C', 200C", 200C''', 200A''' to support the processing associated with the CAO in accordance with the present invention. As shown, the exemplary node 200 includes a processor 206, memory 210, a network interface 208, and may include wireless interface 209, coupled together by a bus 207 over which the various elements 206, 207, 208, 209 and 210 can interchange data and information. The network interface 208 is used to couple the node 200 to one or more network elements, e.g., other nodes 200 and/or the Internet. In this manner, the node 200 may be a general router node 200B and can serve as a communications element between mobile nodes MN 300, 301 serviced by an access node 200C and other network elements. The access node 200C may be a wireless access router which additionally includes wireless interface 209 including a receiver 202 and a transmitter 204. Receiver 202 is coupled to an antenna 203 for receiving signals from mobile nodes 300, 301. The transmitter 204 is coupled to a transmitter antenna 205 which can be used to broadcast signals to mobile nodes 300, 301.

Operation of the node (router) 200 is controlled by the processor 206 under direction of one or more routines stored in the memory 210. Memory 210 includes communications routines 220, data 217, access router ingress filtering routine 222, general router ingress filtering routine 224, Home Agent routine 226, a CAO management (check) subroutine 223 used by routines 222, 224 and 226, messages such as packets 216, and information 212 that includes unicast routing/forwarding table 213, multicast routing/forwarding table 214 and active addressing state for the valid prefixes at an access router and the address allocations (HoAs and CCoAs) made to or used by MNs 300, 301 at an access router 200C or a home agent 200A'''. Tables 213, 214 are also known as binding tables. Communications routines 220, include various communications processes to support the reception, checking and forwarding of messages such as IP packets, for mobile nodes 301, 301 and correspondent nodes 310", 311". Data 217 includes data to be transmitted to, or received from, one or more mobile nodes 300, 301. Data 217 may include policy state for the forwarding of packets from MNs 300, 301 such as whether ingress filtering is enabled, and the MN specific mobility policy in an access router 200C and a Home Agent 200A'''. Access router ingress filtering routine 222 polices the source addresses used by MNs 300, 301 into the network of cell 148 via the ingress interface. Each mobile node 300, 301 in the cell 148 serviced by the access router 200C may have any number of active communications sessions going on at any given time with CNs 310", 311". Access Router ingress filtering routine 222 is ensuring that the MN 300 does not use the source address of another MN 301 in the cell 148, nor a source address that is invalid at this access router 200C due to it not being under the routing prefixes configured at that router 200C, such as from CN 310". General router ingress filtering routine 224, used by, e.g., router 200B, is similarly used to police source addresses but this time by comparing the incoming interface at which the packet arrived to the expected interface according to unicast and/or multicast routing tables 213, 214. Home Agent ingress filtering routines 226, used by, e.g., HA 200A''', are responsible for controlling the mobility of the MNs 300, 301 and the forwarding to and from that MN 300, 301 when the MN 300, 301 is on a home network 110 or on foreign network, e.g. in cell 148. The CAO management (check) subroutine 223 is used in the various router types: home agent router node 200A''', general router 220B, and access router 200C to enhance source address checks and forwarding processes for the MN 300 so that CAO processes defined by this invention are supported. Messages 216 may be stored packets sent to notify routers of the CAO and mobility status of the MN 300, as well as messages to notify session peers 310", 311" of the CAO capabilities of the access router 200C and Home Agent 200A''', or to inform communication peers 310", 311" of the dropping of a message due to an incorrect CAO or unsupported feature. Information 212 includes address and mobility information for each active user and/or mobile node 300, 301 serviced by an access router 200C and Home Agent 200A'''. It also includes the expected source addresses for each MN 300, 301 given its location, and the expected interface on which that source address should be received.

In accordance with the present invention, the source address check on the packets from the MN 300, whether in a Home Agent 200A''', general router 200B or access router 200C can be made on the topologically correct address in the CAO, rather than on the source address of the packet, so that the HoA of the MN 300 can be used as a source address on foreign networks, and so that the CN 310" can be informed of the current address location of the MN 300, with that location verified by the routing infrastructure to various degrees commensurate with the location application. Various exemplary CAO management (check) subroutines and associated processes may be used at the routers 200 as subroutines 223 as outlined in the Invention description above and in the specific embodiment detailed below in FIGS. 13 and 14.

Figure 12:
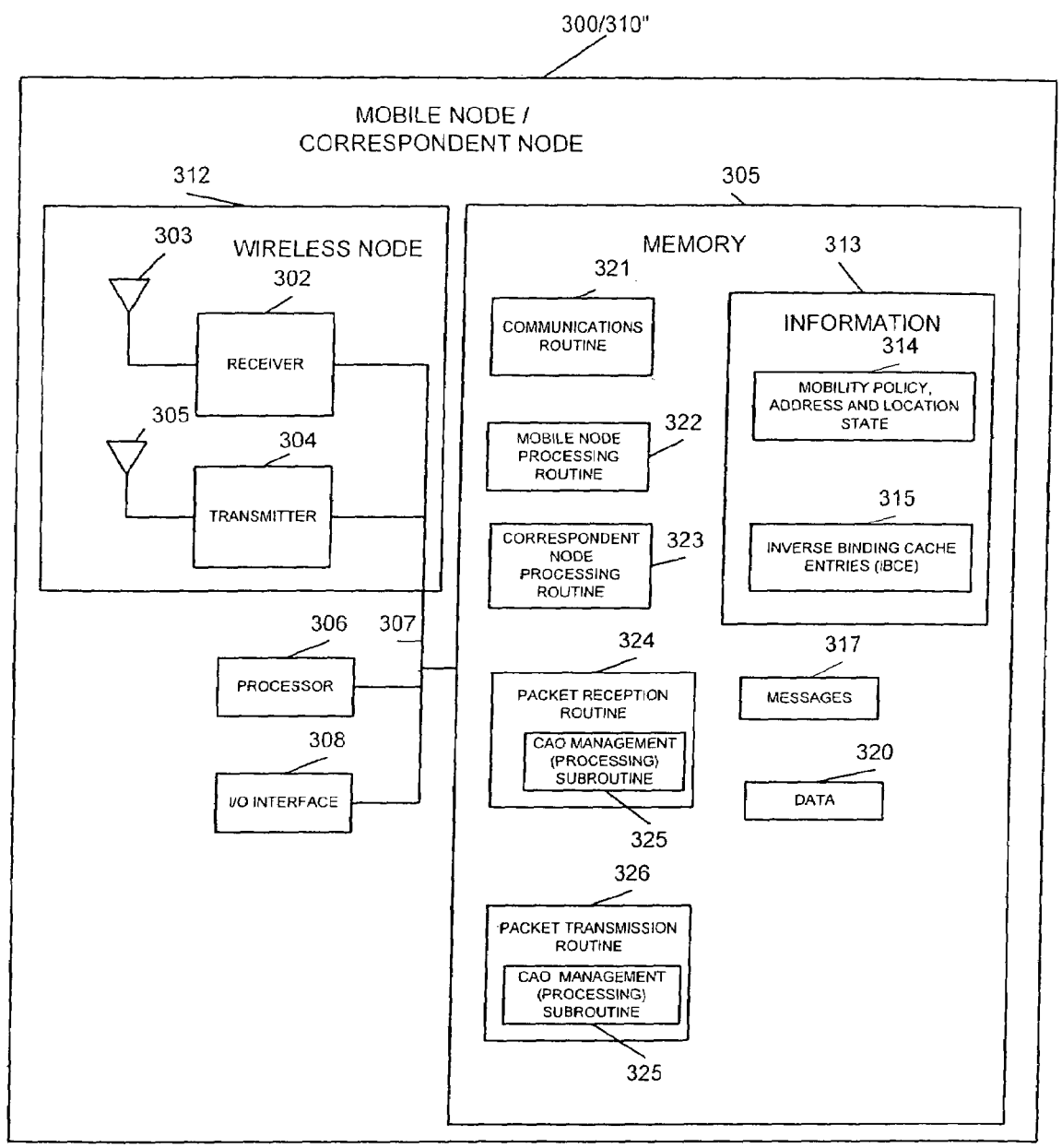
FIG. 12 is a block diagram of an exemplary mobile node/correspondent node that may be used in the communications system of FIG. 10.

FIG. 12 is a block diagram of an exemplary mobile node (MN) 300 and/or Correspondent Node 310" that may be used as one of the mobile nodes 300, 301, 300', 301', 300" or correspondent nodes 310"/311" in the various cells 148, 148', 148" and network 110 of the communications system shown in FIG. 10, in conjunction with the exemplary nodes 200 of FIG. 11. When used in combination with the node 200 of FIG. 11, in accordance with the present invention, mobile node 300 can support the maintenance of direct communications between itself 300 and a Correspondent Node 310" (and visa-versa) when the MN 300 uses its HoA as a source address on a foreign network, e.g., in cell 148, and in so doing avoids reverse tunneling packets via the Home Agent 200A'''. In addition, the MN 300 and CN 310" may exchange and verify information with the routers 200A'''/B/C'/C"/C''' about the movement and location of the MN 300, leading to the creation of an Inverse Binding Cache entry for that MN 300 at the CN 310".

The exemplary MN 300/CN 310" includes processor 306, memory 305, and I/O interface 308 coupled together by a bus 307 over which the various elements 306, 305, and 308 can interchange data and information. I/O interface 308 may interconnect MN 300/CN 310" to access routers 200C, 200C', 200C", 200C'''. If the MN 300 or CN 310" is a wireless connected node then node 301/310" also includes wireless node components 312, which include a receiver 302 and transmitter 304, coupled to bus 307. The receiver 302 is coupled to an antenna 303 for receiving signals from one or more access nodes 200C, 200C' etc. The transmitter 304 is coupled to a transmitter antenna 305 which can be used to broadcast signals to access nodes 200C, 200C', 200C", 200C'''. The mobile node 300 can interact with other mobile nodes 301, correspondent nodes 310", 311", and other network elements, e.g., HA 200A''' by establishing communications sessions through an access router 200C, 200C', 200C", 200C'''.

Operation of the mobile node/correspondent node 300/310" is controlled by the processor 306 under direction of one or more routines stored in the memory 305. Memory 305 includes communications routines 321, data 320, mobile node processing routine 322, correspondent node processing routine 323, packet reception routine 324, packet transmission routine 326, CAO processing subroutine 325, messages, e.g., packets 317, and information 313. Communications routines 323, include various communications applications which may be used to provide particular services, e.g., IP telephony, E-mail, video, games, etc. to a user of the mobile node/correspondent node 300/310". Data 320 includes data to be transmitted to, or received from an access node, e.g., access node 200C. Data 320 may include, e.g., voice data, E-mail packets, video images, game data, etc. Mobile node processing routine 322 is used to oversee various communications sessions which may be supported by the access router 200C and Home Agent router 200A''' at any given time, to detect and to respond to various mobility and trigger events.

In response to a trigger event, such as receiving a particular message or detecting a hand-off, the mobile node processing routine 322 can control the mobile node 300 to transition a communications session between access routers whilst maintaining the HoA as a session address by updating the CCoA in the Home Agent 200A'''. Similarly Correspondent Node 310" includes a similar routine 322 if the CN 310" is also mobile and has a subset of the routine 322, a correspondent node processing routine 323 if CN 310" is fixed in the infrastructure for the session. Each mobile node 300 may have any number of active communications sessions going on at any given time with any number and combination of mobile and fixed Correspondent Nodes 310", 311". Packet reception and transmission routines 324, 326 are used to receive and send packets as part of said sessions. Packet reception and transmission routines 324, 326 include a CAO management (processing) subroutine 325 which deals with the CAO specific aspects of those routines 324, 325. The CAO subroutine 325 is shared across the two routines 324, 326 because the CAO processing itself involves the sending and receiving of packets within a session with the CAO or its reflected CAO included in those packets. The CAO subroutine 325 is used with information 313 and messages 317 to add the correct address into the CAO within said messages 317 so that the MN 300 can send directly from the foreign network, e.g., within cell 148, with its HoA as a source address, and to also communicate its location to the CN 310", irrespective of its location or the routing of its packets towards the CN 310" (direct from foreign and home networks) or via a reverse tunnel to the Home Agent 200A'''. The routine 325 is responsible for generating packets in accordance with the invention, e.g., having the format and content shown in FIG. 5. The generated packet(s) are stored in memory 210, e.g., in the set of messages 216, prior transmission of the packets by transmitter 204. The information 313 includes the mobility policy, location and address state information 314 distributed between the MN 300 and the access router 200C and the Home Agent 200A'''. Information 314 specifically indicates whether or not the home agent 200A''' and access router 200C support the CAO processing in this invention which is communicated to the MN 300 in messages from such nodes 200A''', 200C. The information 313 also includes, in the Correspondent Node 310", Inverse Binding Cache Entries (IBCE) 315 for each MN 300 that the CN 310" is tracking, which includes information on the MN 300 location/movement history, how that location was obtained and the confidence level attached to obtaining that location. IBCE info 315 also includes information about if, when and how the location has been verified. Specifically, the MN 300 can set the M flag in the CAO when it is undergoing a hand-off to inform the CN 310" of that hand-off. In the MN 300, the IBCE 315 includes information on whether and how the CN 310" is tracking the location of the MN 300, and transient information when the MN 300 is waiting for receipt of a reflected CAO or whether and when the MN 300 should send an updated CAO to the CN 310" due as a result of a timer process or due to an incorrectly received reflected CAO. Messages 317 may include stored packets sent to notify communications session participants of the MN location or to inform the MN 300 and HA 200A''' of the location that the CN 310" has for the MN 300. Messages 317 may also include stored packets sent to session peers to inform them that a packet has been dropped due to a problem during the CAO processing. An exemplary mobile node/correspondent node CAO management (processing) subroutine 325 will be discussed in detail below with respect to FIG. 14.

Figure 13:
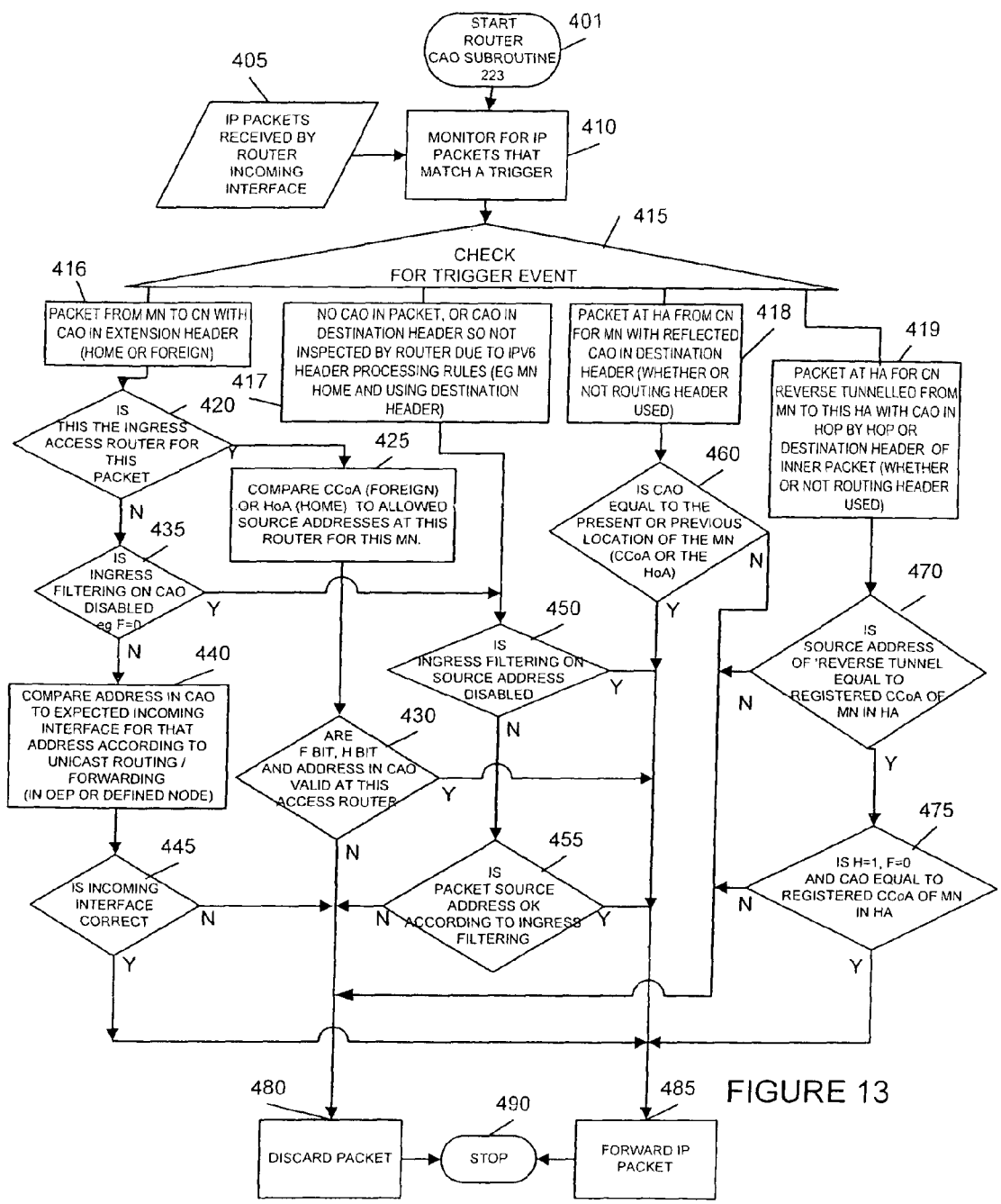
FIG. 13 is a flow diagram illustrating the steps of an exemplary subroutine that can be used by a router to police the contents of packets, sent by mobile nodes, including Care of Address Option (CAO) fields in accordance with the present invention.

FIG. 13 is a flow diagram illustrating the steps of an exemplary node CAO management (check) subroutine 223 that can be used at exemplary Home Agent node 200A''', access node 200C, and general router node 200B. The routine 223 starts in step 401 when the routine 223 is executed by the node's processor 206, e.g., after the node 200 is powered up. As indicated by input block 405, the main acts of the method of subroutine 223 are performed in response to trigger events 405, which correspond to the receipt of messages, such as IPv6 packets, which will be used henceforth and called packets in the description without loss of generality. Packets that include a Care of Address Option (CAO) or equivalent message extension, are detected in step 410 and the associated trigger events checked in step 415, which cause processing associated with the trigger event to proceed in step 415. Monitoring is performed in step 410 on a continuous basis with each detected trigger event resulting in separate processing, e.g., by steps 415 and the following specific sequence corresponding to the specific type of trigger event. Trigger events 405 include, for example, the arrival of a packet with a CAO at a HA 200A''' that has been reverse-tunneled by the mobile node 300 from a foreign subnet, or arrival of a packet with a CAO at an access node 200C from a MN 300 using its home address as a source address. Note that 415 includes a trigger event check for a packet that does not invoke CAO specific processing due to it either being missing from the packet, or as a result of not being able to process a CAO due to the node following correct IPv6 processing rules for the Extension Header type in that node due to the type of header extension. A trigger event is not included for the case where CAO specific processing should be invoked but the node 200 does not understand the CAO option, which causes the packet to be discarded. This packet discarding, by nodes 200 without CAO option capability, is used to prevent fraudulent CAOs being passed through a legacy network infrastructure that neither understands, nor can process correctly, the CAO. Various packets types may be generated either by MNs, e.g., 300, 301 or CNs, e.g., 310", 311" in the cells 148, 148', 148" or the network 110, and the triggers that can be invoked at a router node 200 are dependent on whether that router node 200 is a home agent node 200A''', an access router node, e.g., 200C, or a general router node 200B for the packets sender, and where the MN 300, 300', 300", 300''' is located relative to both the HA 200A''' and the CN 310". In step 415, if the trigger is the arrival of a packet with a CAO in an extension header, such as a Hop By Hop or Destination header, at an access router 200C or general router node 200B (416), then processing passes to step 420. In step 420, it is determined whether this router 200 is the ingress access router node 200C for the sending MN 300, and if it is not then the router 200 is a general router node 200B and processing passes to step 435. At step 435 it is determined whether or not this general router node 200B, which may be an Option Enforcement Point (OEP) which polices the contents of options despite the IPv6 header processing rules or a Defined Point (DP) in accordance with the header rules, should undertake ingress filtering on the CAO in arriving packets. The CAO includes the F bit which is checked to make this determination. If the F bit is set it indicates that ingress filtering should be on the CAO contents rather than the packet source address. If the F bit is set the node 200B undertakes a CAO ingress filtering check, with processing passing to step 440 where the incoming interface of the packet and the contents of the CAO, which is the senders location (CCoA or HoA), is compared to the unicast routing table 213 (ingress filtering) or multicast routing table 214 (Reverse path forwarding check) depending on packet type, to determine if for that location and packet type, that the packet arrived on the correct incoming interface. If the packet arrived on the correct interface at step 445, then we move to step 485 where the packet will be forwarded as normal. This enables the packet to be forwarded if the address in the CAO is topologically correct whilst allowing the source address to be topologically incorrect. If the packet has not arrived on the correct interface then we next execute step 480 where the packet will be discarded due to it arriving incorrectly. This prevents the forwarding of packets from packet senders who have inserted incorrect addresses into the CAO and lied about their location.

Referring back to step 435, if the router 200B disables CAO assisted ingress filtering because the F bit in the CAO is unset (F=0), then processing passes to step 450 where a check is made to see if ingress filtering on the actual source address is available. If ingress filtering on the source address is available, then processing passes to step 455 where the ingress filtering (unicast packet) or RPF check (multicast packet) is undertaken using the source address rather than the CAO as is presently optionally undertaken in general routers. If the source address is topologically correct then the packet is forwarded at step 485 whilst if it is incorrect then the packet is dropped at step 480.

Referring back to step 420, if the router 200 is the ingress access router 200C for the sending mobile node 300, then the ingress filtering check on the CAO is performed and at step 425 the contents of the CAO are compared to the valid address prefixes on this access router 200C for the incoming interface and for that MN 300. This ingress filter check on the CAO is performed to prevent one MN 300 using the address information from another MN 301 on the same access router 200C. Note that a mobile node 300 should not use its HoA as a source address and should not include a CAO if its access router 200C does not support the CAO, because the access router 200C will drop this packet by default. The support for the CAO is therefore announced by the ingress access router 200C to the mobile node 300 in its Router advertisement. This annunciation of CAO support from ingress access router 200C to MN 300 is also used to prevent the initial mobile nodes packets from being dropped at the access router 200C due to an uninformed attempt to use a topologically incorrect source address. At step 430, if the address in the CAO is valid at the ingress access router 200C, and the F bit and H bits are correctly set given the location of the MN 300, then the packet is forwarded at step 485, whilst if it is invalid it is dropped at step 480. When MN 300''' is on its home network 110 and directly communicating with CN 310" or when MN 300 is on a foreign network, e.g. in cell 148, and the MN 300 is directly communicating with the CN 310", then the F bit should be set and the H bit should be unset, in accordance with the invention. These bit setting (F bit=1 and H bit=0) indicates that the HA 200A''' has not been visited and the access router 200C should pass the CAO contents through a CAO aware ingress filtering check. When a MN 300 is on a foreign network, e.g., in cell 148, and reverse tunneling to the HA 200A''', then the F bit should be unset and the H bit should be set, in accordance with the invention. These bit settings (F bit=0 and H bit=1) inform the home access router 200C''' that the HA 200A''' has been visited which has verified the CAO contents are correct and from the foreign network 148, and that the home access router 200C''' can allow the F bit to be unset so that the ingress filtering check in that access router and subsequent nodes 200B, 200C' etc, can be on the topologically correct source address rather than the topologically incorrect CAO. Note that if the mobile node 300 includes a potentially fraudulent CAO at an ingress access router 200C or a core router 200B which does not support CAO assisted ingress filtering, then the processing rules for the CAO will ensure it is dropped to ensure the new mechanism works correctly through legacy routers that do not understand CAO processing. A home mobile node 300''' has no incentive to include a fraudulent CAO from its home location because the home access router 200C''' will always discard it, and if it wishes to hide its location from the CN 310" it can simply not add a CAO.

The next trigger event (417) described occurs at either a Home Agent 200A''', general router 200B and/or any access router 200C, 200C', 200C'', 200C''' when the packet either does not include a CAO, or the CAO cannot be seen by the router 200 due to it not being a Defined Point and hence following IPv6 packet processing rules for the extension header type that includes the CAO. In either of these cases, the processing passes to step 450 where it is determined whether this node 200 has ingress filtering on the source address disabled. If it is disabled then the packet is forwarded normally at step 485 whereas if it is not disabled then the source address of the packet is once again checked against the unicast or multicast routing tables (213, 214) in step 455 to check that the incoming interface is correct and that therefore the source address is topologically ok. Note that this trigger 417 does not deal with the case (not shown in FIG. 13) of the legacy router that is a Defined Point (DP) and does not recognize the CAO and is instructed by the processing rules for the Care of Address Option to discard the packet. This will prevent a MN 300 from issuing a fraudulent CAO in an extension header via a legacy ingress access router 200C and through other routers 200.

The next trigger event 418 is specific to a Home agent node 200A''' when the home agent receives a packet from the CN 310", intended for the MN 300, with the reflected CAO (R bit set) in an IPv6 Destination Header, derived from the CAO that was sent from the MN 300 to the CN 310". The processing at the HA 200A''' can be undertaken whether or not the packet contains a routing header, to ensure that the HA is explicitly instructed to process the CAO in the Destination Header. The CAO is seen to be reflected by the setting of the R bit in the CAO. Its contents (the location address of the MN 300) is checked at the HA 200A''' in step 460 by comparing it to the present and recent registered bindings in the HA 200A''' for that MN 300. If the contents of the CAO do not match a recent location for the MN 300 then it is a fraudulent CAO and the packet is dropped at step 480. However, if the CAO does match a recent location for the MN300 in the HA200A''' such as a CCoA from access router 200C, then the CAO is correct and the packet can be forwarded to the MN 300 in step 485. More detailed processing and verification checks can also be made as detailed in the Invention summary.

Another trigger 419 is also at the HA 200A''' but this time for a packet which is reverse-tunneled by the MN 300 from a foreign subnet 148 to the HA 200A''' with a CAO in a Destination Header which includes the current CCoA of the MN 300 at node 200C. The CAO check in the HA 200A''' is performed to ensure that the MN 300 is not lying about its location at the foreign subnet 148. The first check is undertaken at step 470 by comparing the source address of the reverse tunneled packet to the registered CCoA of the MN 300 at the HA 200A''' which is required to prevent injection of fraudulent packets into the home network 110. If the source address is incorrect then the packet is discarded at step 480 whereas if the source address is correct then the processing passes to step 475. At step 475 the contents of the CAO is now compared to the registered binding for that MN 300 in the HA 200A''' to verify that the CAO includes the current CCoA location of the MN 300. This ensures that when the outer encapsulation is removed, leaving a packet with the home address of the MN 300, the CN 310" can still discover the CCoA of the MN 300. Step 475 also ensures that the H bit is set and the F bit is unset so that the home access router 200C''' will pass the packet during its ingress filtering check. If the CCoA in the CAO is correct then the packet is decapsulated and forwarded at step 485 whereas it is discarded at step 480 if it or the flags are incorrect. Note that a routing header can be used to explicitly trigger the HA 200A''' to process the CAO or the HA 200A''' can act as an OEP and snoop the CAO in the packet.

Finally, following the decision to either forward or discard the packet as a result of triggers 416, 417, 418, 419, the processing passes from either step 480 or step 485 to step 490 where the subroutine 223 processing for this packet finishes and we return to 410 to monitor packets for trigger events.

Figure 14:
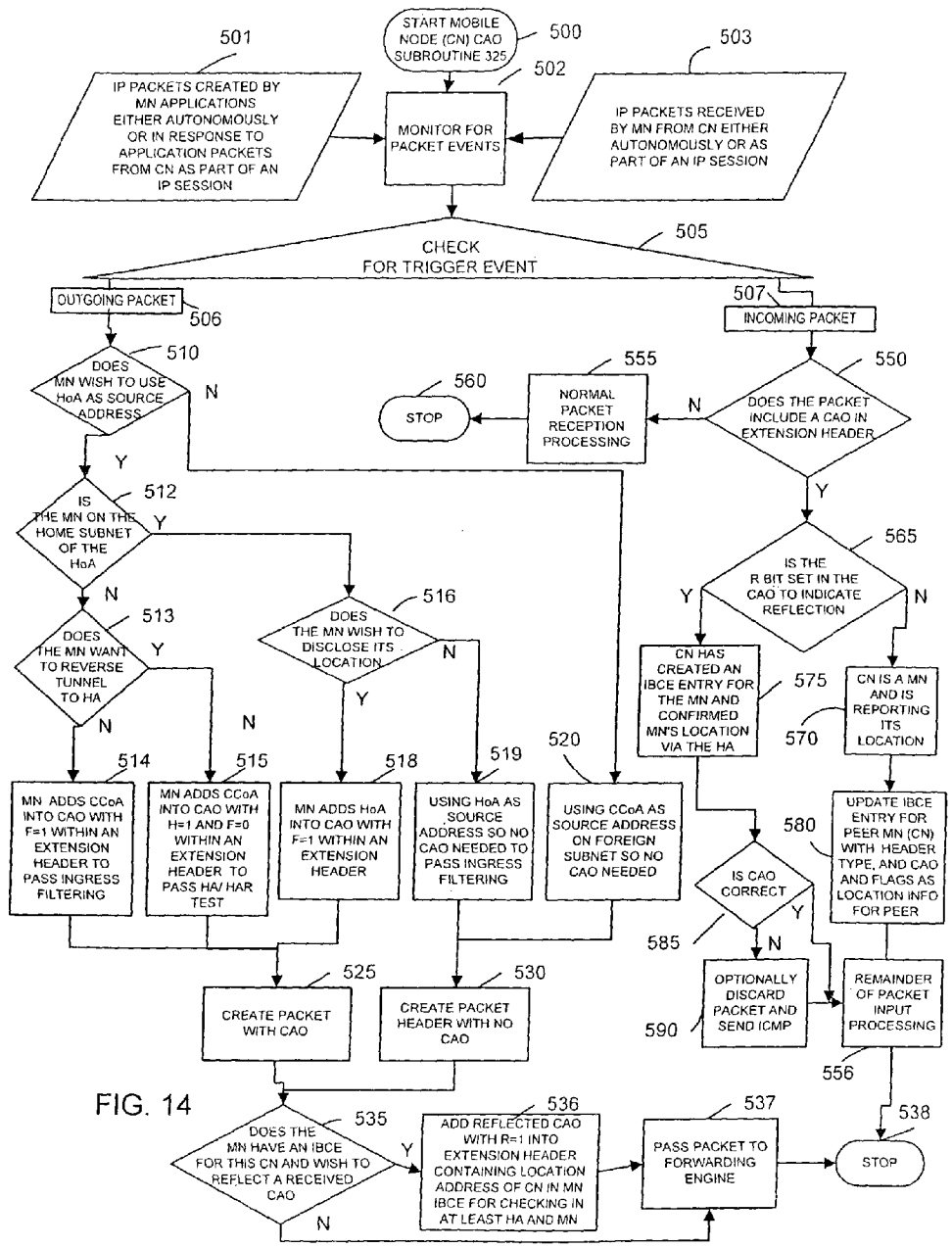
FIG. 14 is a flow diagram illustrating the steps of an exemplary subroutine that can be used by a mobile node and/or correspondent node to control the transmission and reception of packets containing the Care of Address Option field in accordance with the present invention.

FIG. 14 is a flow diagram illustrating the steps of an exemplary node CAO management (processing) subroutine 325 that can be used at exemplary mobile node 300/301, 300'/301', 300"/301", or 300'''/301''', as well as at exemplary correspondent node 310"/311". Operation starts instep 500, when the routine 325 is executed by processor 306, e.g., as the node 300/310" is powered up. The subroutine 325 has as inputs at block 501, the generating of messages such as IPv6 packets from the applications on the MN 300 or CN 310", and at block 503 the reception of messages such as IPv6 packets, from session peers MN 300, CN 310". The rest of the processing will be described without loss of generality assuming the messages are IPv6 packets. These packet inputs 501, 503 are monitored at step 502 to look for trigger events which are then passed to step 505 where the specific trigger event is determined and the specific associated processing undertaken. Two trigger events 506, 507 are the arrival of an outgoing or an incoming packet (506, 507), respectively. If the trigger event is the arrival of an outgoing packet 506 then at step 510 a check is made as to whether the packet source address is/will be the home address (HoA) of the MN 300. If it is not and is instead to be the CCoA on the foreign network, e.g. in cell 148, then processing passes to step 520 where a CAO is not required so processing passes to step 530 where the correct format without the CAO is created.

Referring back to step 510, if the HoA is to be used as the source address then the processing passes to step 512 where a check is made as to whether the MN is on its home subnet 110. If it is, and at step 516 the MN does not wish to disclose its location to the CN 310" then processing passes to step 516 where the HoA will be used as the source address and at step 530 a packet is once again created without a CAO. However, if at step 516 the MN wishes to disclose its location to the CN 310" then processing passes to step 518 where the HoA is added into the CAO within an extension header with the F bit set (MN is home), such as a Hop By Hop or Destination Header. The header type is selected for policy reasons from information in mobility information 314. At step 525 a packet is created with a CAO using the selected header type.

Referring back to 512, if the MN 300 is not on its home network 148 and at step 513 the MN 300 wishes to reverse tunnel to the HA 200A''' then at step 515 the MN 300 will add its CCoA into the CAO with H bit set to indicate HA 200A''' is to be visited, and with the F bit unset so that the topologically incorrect CAO can pass the home access router 200C'''. The CAO is then added within the selected extension header type (such as Hop By Hop or the Destination Header from information 314) to disclose its foreign location to the CN 310". The MN 300 can optionally use a routing header to route this via the HA 200A''' so that the HA 200A''' can verify the CAO as a DP rather than as an OEP. Processing then passes to step 525 where a packet is once again created with a CAO. This results in the CAO at step 515 including the CCoA of the MN 300 on the foreign network, e.g., in cell 148, which is verified by the HA 200A''' of the MN 300. However, if at step 513 the MN 300 does not wish to reverse tunnel to the HA 200A''' then step 514 is undertaken where the MN 300 adds its CCoA into the CAO with the F bit set, within the selected extension header type, and at step 525 a packet is again created with a CAO. The F bit set is to ensure that the CCoA is checked in the foreign access router 200C before being forwarded directly to the CN 310" via flow 180.

Now at steps 525 and 530 a packet is created with or without a CAO, before being passed to step 535. In step 535, a check is made as to whether the MN 300 has an Inverse Binding Cache Entry (IBCE) 315 for the CN 310" generated by the previous reception of a CAO from that CN 310" in a previous packet. If an IBCE 315 exists then the MN 300 has the option whether to reflect the CAO of the CN 310" back to that CN 310" which is the destination of this packet. If at 535 the MN 300 wishes to reflect the CAO of the CN 310" then at 536 the reflected CAO with the R bit set is added to the packet in a Destination option before being passed to 537 where the packet is completed and passed to the forwarding engine before the subroutine 325 stops at step 538 so that monitoring at step 502 can be commenced for the next packet. Alternatively, if at step 535 the MN 300 does not wish to reflect the CAO of the CN 310' then processing moves to step 537 where the packet is passed unchanged to the forwarding engine before the subroutine 325 once again stops at step 538.

The second trigger 507 is the arrival of a packet from a CN 310" where a test is made at step 550 to see if the packet includes a CAO. If the incoming packet does not include a CAO then processing passes to step 555 where normal MN 300 packet reception processes 324 are undertaken before the subroutine 325 stops at step 560 and the processing moves to the monitoring of packet events at step 502. However, if the incoming packet at step 550 does include a CAO then processing passes to test 565 to see if the CAO that was originally sent by the MN 300 has been reflected back to the MN 300 by the CN 310". The test of step 565 includes a check of the R bit in the CAO. If the R bit which is set in the CAO indicates reflection. If the R bit=1, the flow proceeds to step 575, where the MN 300 learns that the CN 310" has created an IBCE 315 for the MN 300, and the MN 300 determines by analyzing the contents of the CAO at step 585 whether the CN 310" has the correct address installed in its IBCE 315. The MN 300 can in addition check to see whether the reflected CAO has been verified by its HA 200A''' through the use of a routing header. If the CAO is incorrect then the MN 300 optionally marks the packet for discarding at step 590 depending on local policy in information 314, before passing the packet to step 556. If however the contents of the reflect CAO are correct then the processing passes directly to step 556 which is where the remainder of the normal reception processing of packet reception routine 324 is undertaken, which concludes with the packet either being passed to the transport layer of the MN 300 or being discarded, before the subroutine 325 completes at step 538 and packet monitoring continues at step 502. If the packet with an incorrect CAO is not discarded, then the MN 300 should instead aim to rapidly issue a new CAO to the CN 310" in a future packet, and mark such a flag in its mobility information 314.

Referring back to step 565, if the CAO is not reflected (R bit=0 in CAO) then it is an updated CAO from the CN 310" and the CN 310" is therefore reporting its location at step 570. This causes the MN at step 580 to update its IBCE 315 entry for the session peer (the CN 310") or create a new IBCE 315 entry for this CN 310" if none exists, composed of the address in the CAO, the CAO flags, and the type of header(s) used to transport the CAO (which implies how much it can be trusted). A Hop By Hop header will have been examined by the nodes along the hop by hop route through which the message is routed whilst a destination header above a routing header will be checked by the DP nodes in the routing header and the final destination, whilst a destination option below a routing header will be checked by the destination. Other nodes such as OEPs may in addition check the CAO but the CN 310" cannot know this. The more nodes that check the CAO then the more confidence the CN 310" can have in its contents in general. In addition, the IBCE 315 includes a flag which indicates that a new CAO has been received and that the CAO has not yet been reflected back to the CN 310" for verification so that the MN 300 outgoing interface can be primed to do this as performed in accordance with local policy. Processing once again passes to 556 where the remaining packet reception processing of routine 324 is completed before the subroutine 325 completes at step 538. MN 300 continues to monitor for new packet events at step 502.

The steps and methods of the present invention may be implemented using software modules, hardware modules or a combination of software and hardware.

What is claimed is:

1. A communications method for use in a communications system including an end node and a first router, the method comprising:
    operating said first router to receive a packet including a source address and an option field, said option field including a Care of Address corresponding to said end node; and
    operating said first router to perform ingress filtering using said Care of Address as an ingress filter input, the result of said filtering being conditional on the value of the Care of Address.

2. The method of claim 1, wherein said ingress filtering is not dependent on the value of the source address.

3. A communications method for use in a communications system including an end node and a first router, the method comprising:
    operating said first router to receive a packet including a source address and an option field, said option field including a Care of Address corresponding to said end node;
    operating said first router to perform ingress filtering using said Care of Address as an ingress filter input, the result of said filtering being conditional on the value of the Care of Address; and
    wherein said ingress filtering is conditional on both the source address and the Care of Address.

4. The method of claim 3, wherein said ingress filtering includes checking to determine if said source address and said Care of Address are in a binding table included in said first router.

5. The method of claim 1, wherein said packet is a multicast packet and wherein said ingress filtering includes:
    performing a reverse path forwarding check for said multicast packet.

6. The method of claim 1, wherein operating to receive a packet includes:
    receiving said packet on an interface; and
    determining if said Care of Address includes an address preface matching an address prefix associated with said first router.

7. The method of claim 1, wherein operating to receive a packet includes:
    receiving said Packet on an interface; and
    determining if said Care of Address includes an address prefix matching an address prefix associated with said interface on said first router; and
    setting a flag in said packet indicating that said Care of Address has been validated when said determining indicates that said Care of Address includes an address prefix associated with said interface on said first router.

8. A communications method for use in a communications system including an end node and a first router, the method comprising:
    operating said first router to receive a packet including a source address and an option field, said option field including a Care of Address corresponding to said end node, said step of operating to receive a packet including:
        i) receiving said packet on an interface; and
        ii) determining if said Care of Address includes an address preface matching an address prefix associated with said first router;
    operating said first router to perform ingress filtering using said Care of Address as an ingress filter input, the result of said filtering being conditional on the value of the Care of Address; and
    wherein said ingress filtering passes packets having a source address that has a prefix which differs from any prefix associated with said interface on said router when said Care of Address includes a prefix which matches an address prefix associated with said interface on said first router.

9. The method of claim 1, further comprising:
    operating an additional router to receive the packet from the first router; and
    wherein said packet includes an indicator indicating whether said additional router should exclude information from the option field including said Care of Address when performing ingress filtering.

10. A communications method for use in a communications system including an end node and a first router, the method comprising:
    operating said first router to receive a packet including a source address and an option field, said option field including a Care of Address corresponding to said node;
    operating said first router to perform ingress filtering using said Care of Address as an ingress filter input, the result of said filtering being conditional on the value of the Care of Address;
    operating an additional router to receive the packet from the first router, said packet including an indicator indicating whether said additional router should exclude information from the option field including said Care of Address when performing ingress filtering; and
    wherein said first router is an access router, the method further comprising:
    operating said first router to ignore said indicator when determining what information to use when performing ingress filtering.

11. A communications method for use in a communications system including an end node and a first router, the method comprising:
    operating said first router to receive a packet including a source address and an option field, said option field including a Care of Address corresponding to said node;
    operating said first router to perform ingress filtering using said Care of Address as an ingress filter input, the result of said filtering being conditional on the value of the Care of Address;

wherein said communication system further includes a mobile IP home agent, the method further comprising:
operating said mobile IP home agent to receive said packet;
operating said mobile IP home agent to determine if the Care of Address in the option field of the received packet includes a Care of Address which matches a Care of Address, corresponding to said end node, that is registered with said mobile IP home agent; and
operating said mobile IP home agent to drop said received packet when it is determined that the Care of Address in the option field of the received packet includes a Care of Address which does not match a registered Care of Address corresponding to said end node.

12. The method of claim 10, wherein said communications system further includes a mobile IP home agent, the method further comprising:
operating said mobile IP home agent, prior to performing determining and said dropping steps, to check said option field for an indicator indicating that said determining and said dropping steps should not be performed.

13. An apparatus comprising:
a machine readable medium, said machine readable medium including:
an Internet Protocol packet from a source node coupled to a first access router used to route messages from said source node, said access router being a single Internet Protocol hop from said source node, said first access router having a first address prefix of length L bits, where L is a positive integer greater than 0, said message including:
i) a source address field including a source address;
ii) a destination address field including a destination address, said destination address corresponding to one of another node and a group of nodes to which said packet is being directed; and
iii) an option field, said option field including an additional address having a second address prefix that includes the L bit prefix of said first access router as the first L bits of said second address prefix, said address for use in ingress filtering performed by an ingress filter at said first access router; and
a transmission module for transmitting said packet.

14. The apparatus of claim 13, wherein said source address field includes a first M bits where M is a positive integer greater than 0, said M bits being the same as an M bit prefix of a second router which serves as a mobile IP borne agent for said source node.

15. The apparatus of claim 14, wherein said first access router to which said first address prefix corresponds serves as a mobile IP attendant node.

16. The apparatus of claim 13, wherein said additional address in said option field is a mobile IP Care of Address.

17. The apparatus of claim 13, wherein said first access router operates as a mobile IP home agent for said source node.

18. The apparatus of claim 13, wherein said source address is an address used by said source node when coupled to a mobile IP Home Agent node without any intervening routing hops.

19. The apparatus of claim 13, wherein said option field further includes:
an indicator that indicates whether the additional address included in said option field is associated with one of said source and destination address included in said message.

20. The apparatus of claim 13, further including in said option field:

an indicator that indicates whether ingress filtering performed by a router receiving said message should be undertaken on the additional address included in said option field instead of said source address.

21. The apparatus of claim 13, further comprising in said option field:
an indicator that indicates whether the additional address included in said option field includes only the L bit prefix of said first access router.

22. The apparatus of claim 13, further comprising in said option field:
an indicator that indicates that the additional address in the option field will be verified as the true location of said source node by a mobile IP Home Agent node associated with said source node.

23. The apparatus of claim 13, wherein said option field further includes an indicator indicating that said source node is starting a hand off from the access node to which said additional address corresponds.

24. The apparatus of claim 13, wherein said apparatus is a router and wherein said machine readable medium is a memory used for storing received IP packets, said option field further including:
a first indicator that indicates whether ingress filtering performed by a router receiving said message should be undertaken on the additional address included in said option field instead of said source address;
a second indicator that indicates whether the additional address included in said option field includes only the L bit prefix of said first access router;
an indicator that indicates that the additional address in the option field will be verified as the true location of said source node by a mobile IP Home Agent node associated with said source node; and
wherein said router includes means for processing said IP packet according to at least one of said indicators included in said option field.

25. The apparatus of claim 13, wherein said apparatus is a mobile node and wherein said machine readable medium is a memory used for storing IP packets generated by said mobile node.

26. The apparatus of claim 25, wherein said option field further includes:
a first indicator that indicates whether ingress filtering performed by a router receiving said message should be undertaken on the additional address included in said option field instead of said source address;
a second indicator that indicates whether the additional address included in said option field includes only the L bit prefix of said first access router; and
an indicator that indicates that the additional address in the option field will be verified as the true location of said source node by a mobile IP Home Agent node associated with said source node.

27. A communications method for use in a communications system including a mobile node and a first router, the method comprising:
operating said first router to receive a packet including a source address and an option field, said option field including an option type code indicating which nodes receiving said packet should process the contents of said option field in a filtering operation; and operating said first router to use contents of the option field in a filtering operation regardless of the value of the option type code.

28. A communications method for use in a communications system including a mobile node and a first router, the method comprising:

operating said first router to receive a packet including a source address and an option field, said option field including an option type code indicating which nodes receiving said option packet should process the contents of said option field in a filtering operation;

operating said first router to use contents of the option field in a filtering operation regardless of the value of the option type code;

wherein said first router is a firewall which is not the destination of said received packet;

wherein said option type code is of a type which indicates that said first router should not process the information included in said option field; and wherein operating said first router to use contents of the option field includes operating the router to use an address in said option field in a filtering operation.

29. A mobile node including:
a packet generator device for generating a packet to be communicated from said mobile node to a first access router used to route messages from said mobile node to a destination node, said first access router having a first address prefix of length L bits, where L is a positive integer greater than 0, said message including:
   i) a source address field including a source address corresponding to said mobile node;
   ii) a destination address field including a destination address, said destination address corresponding to said destination node to which said packet is being directed; and
   iii) an option field, said option field including an additional address having a second address prefix that includes the L bit prefix of said first access router as the first L bits of said second address prefix, said address for use in ingress filtering performed by an ingress filter at said first access router; and
a transmitter for transmitting said generated packet to said first access router.

30. The mobile node of claim 29, wherein said source address field includes a first M bits where M is a positive integer greater than 0, said M bits being the same as an M bit prefix of a second router which serves as a mobile IP home agent for said source node.

31. The mobile node of claim 29, further comprising:
memory for storing said packet prior to transmission;
wherein said source address is a Home Address; arid
wherein said additional address is a Care of Address.

32. The mobile node of claim 31, wherein said message further includes:
a first indicator that indicates whether ingress filtering performed by a router receiving said message should be undertaken on the additional address included in said option field instead of said source address.

33. The mobile node of claim 32, wherein said message further includes:
a second indicator that indicates whether the additional address included in said option field includes only the L bit prefix of said first access router.

34. The mobile node of claim 33, wherein said message further includes:
an indicator that indicates that the additional address in the option field is to be verified as the true location of said source node by a mobile IP Home Agent node associated with said source node.

35. The method of claim 1,
wherein said end node is a mobile node; and wherein operating said first router to perform ingress filtering includes performing said ingress filtering on said received packet.

36. The apparatus of claim 13,
wherein said source address is a Home Address; and
wherein said additional address is a Care of Address.

37. A mobile node including:
means for generating a packet to be communicated from said mobile node to a first access router used to route messages from said mobile node to a destination node, said first access router having a first address prefix of length L bits, where L is a positive integer greater than 0, said message including:
   i) a source address field including a source address corresponding to said mobile node;
   ii) a destination address field including a destination address, said destination address corresponding to said destination node to which said packet is being directed; and
   iii) an option field, said option field including an additional address having a second address prefix that includes the L bit prefix of said first access router as the first L bits of said second address prefix, said address for use in ingress filtering performed by an ingress filter at said first access router; and
means for transmitting said generated packet to said first access router.

38. The mobile node of claim 37, wherein said source address field includes a first 14 bits where 14 is a positive integer greater than 0, said M bits being the same as an M bit prefix of a second router which serves as a mobile IP home agent for said source node.

39. The mobile node of claim 37, further comprising:
means for storing said packet prior to transmission;
wherein said source address is a Home Address; and
wherein said additional address is a Care of Address.

40. An access router for use in a communications system including an end node and said access router, said access router comprising:
means for receiving a packet including a source address and an option field, said option field including a Care of Address corresponding to said end node; and
means for performing ingress filtering using said Care of Address as an ingress filter input, the result of said filtering being conditional on the value of the Care of Address.

41. The access router of claim 40, wherein said ingress filtering is not dependent on the value of the source address.

42. An access router for use in a communications system including an end node and said access router, said access router comprising:
means for receiving a packet including a source address and an option field, said option field including a Care of Address corresponding to said end node;
means for performing ingress filtering using said Care of Address as an ingress filter input; and
wherein the result of said ingress filtering is conditional on both the source address and the Care of Address.

43. The access router of claim 42, wherein said means for performing ingress filtering includes means for checking to determine if said source address and said Care of Address are in a binding table included in said first router.

44. The access router of claim 43, wherein said packet is a multicast packet and wherein said ingress filtering includes:
performing a reverse path forwarding check for said multicast packet.

45. A computer readable medium embodying machine executable instructions for controlling, an access router to implement a communications method in a communications system including an end node, the method comprising:
- receiving a packet including a source address and an option field, said option field including a Care of Address corresponding to said end node;
- performing ingress filtering using said Care of Address as an ingress filter input; and
- wherein the result of said ingress filtering is conditional on both the source address and the Care of Address.

46. The computer readable medium of claim 45, wherein performing ingress filtering includes checking to determine if said source address and said Care of Address are in a binding table included in said first router.

47. The computer readable medium of claim 46, wherein said Packet is a multicast packet and wherein said ingress filtering includes:
- performing a reverse path forwarding check for said multicast packet.

48. An access router for use in a communications system including an end node and said access router, said access router comprising:
- a receiver module for receiving a packet including a source address and an option field, said option field including a Care of Address corresponding to said end node; and
- a filter module for performing ingress filtering using said Care of Address as an ingress filter input, the result of said filtering being conditional on the value of the Care of Address.

49. The access router of claim 48, wherein said ingress filtering is not dependent on the value of the source address.

50. An access router for use in a communications system including an end node and said access router, said access router comprising:
- a receiver module for receiving a packet including a source address and an option field, said option field including a Care of Address corresponding to said end node;
- a filter module for performing ingress filtering using said Care of Address as an ingress filter input; and
- wherein the result of said ingress filtering is conditional on both the source address and the Care of Address.

51. The access router of claim 50, wherein said ingress filer checks to determine if said source address and said Care of Address are in a binding table included in said first router.

52. A device including a processor configured to control an access router in a communications system including said access router and an end node to implement a communications method for use in a communications system, the method comprising:
- receiving a packet including a source address and an option field, said option field including a Care of Address corresponding to said end node; and
- performing ingress filtering on said received packet using said Care of Address as an ingress filter input, the result of said filtering being conditional on the value of the Care of Address.

53. The device of claim 52, wherein said ingress filtering is not dependent on the value of the source address.

54. A device including a processor configured to control an access router in a communications system including said access router and an end node to implement a communications method f or use in a communications system, the method comprising:
- receiving a packet including a source address and an option field, said option field including a Care of Address corresponding to said end node;
- performing ingress filtering on said received packet using said Care of Address as an ingress filter input; and
- wherein the result of said ingress filtering is conditional on both the source address and the Care of Address.

55. The device of claim 54, wherein said ingress filtering includes checking to determine if said source address and said Care of Address are in a binding table included in said first router.

* * * * *